(12) United States Patent
Ryu et al.

(10) Patent No.: US 11,238,256 B2
(45) Date of Patent: Feb. 1, 2022

(54) DISPLAY DEVICE INCLUDING PHOTOSENSOR UNITS

(71) Applicant: SAMSUNG DISPLAY CO., LTD., Yongin-si (KR)

(72) Inventors: Ji Hun Ryu, Yongin-si (KR); Il Nam Kim, Yongin-si (KR); Jong Hyun Lee, Yongin-si (KR); Jae Kyoung Kim, Yongin-si (KR); Eun Jin Sung, Yongin-si (KR); Seong Ryong Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/887,595

(22) Filed: May 29, 2020

(65) Prior Publication Data

US 2020/0394381 A1 Dec. 17, 2020

(30) Foreign Application Priority Data

Jun. 12, 2019 (KR) ........................ 10-2019-0069617

(51) Int. Cl.
 *G09G 3/20* (2006.01)
 *G06K 9/00* (2006.01)
 *G02F 1/133* (2006.01)

(52) U.S. Cl.
 CPC ........... *G06K 9/00013* (2013.01); *G09G 3/20* (2013.01); *G02F 1/13312* (2021.01); *G09G 2310/08* (2013.01); *G09G 2360/14* (2013.01)

(58) Field of Classification Search
 CPC ...... G06F 3/042; G06F 3/0412; G06F 3/0317; G06F 3/0325; G06F 3/0421; G06F 2203/04101; G06F 3/0416; G06F 3/03547; G06F 2203/04106; G06F 3/0304; G06F 3/0488; H01L 27/14643; H01L 27/14603; G06K 9/0004; G02F 1/13312; G09G 2360/14; G09G 3/367
 See application file for complete search history.

(56) References Cited

U.S. PATENT DOCUMENTS 8,917,387 B1  12/2014 Lee et al.
2011/0109592 A1* 5/2011 Kurokawa ............ G06F 3/0416
                                                    345/175

(Continued)

FOREIGN PATENT DOCUMENTS

KR     10-1900173      9/2018
KR     1020190004678   1/2019
KR     1020190050334   5/2019

*Primary Examiner* — Sanjiv D. Patel
(74) *Attorney, Agent, or Firm* — F. Chau & Associates, LLC

(57) ABSTRACT

A display deice is provided including a substrate. The substrate includes a display region that includes a plurality of pixels and a sensing region provided in at least one region of the display region. A circuit element layer is disposed on the substrate, the circuit element layer includes a plurality of conductive layers. A light emitting element layer is provided on the circuit element layer. The light emitting element layer includes a plurality of light emitting elements. A sensor layer is disposed on the substrate. The sensor layer includes a plurality of photo sensor units each including sensor pixels. The photo sensor units are arranged in an irregular pattern in the sensing region.

20 Claims, 22 Drawing Sheets

(56) References Cited

U.S. PATENT DOCUMENTS

| | | | |
|---|---|---|---|
| 2012/0154354 A1* | 6/2012 | Tsujino | G06F 3/0412 |
| | | | 345/207 |
| 2012/0242636 A1* | 9/2012 | Yuki | G06F 3/042 |
| | | | 345/207 |
| 2016/0204177 A1* | 7/2016 | Kim | H01L 27/1222 |
| | | | 257/40 |
| 2018/0089485 A1* | 3/2018 | Bok | G06F 1/1684 |
| 2019/0013368 A1 | 1/2019 | Chung et al. | |
| 2019/0130155 A1 | 5/2019 | Park | |

* cited by examiner

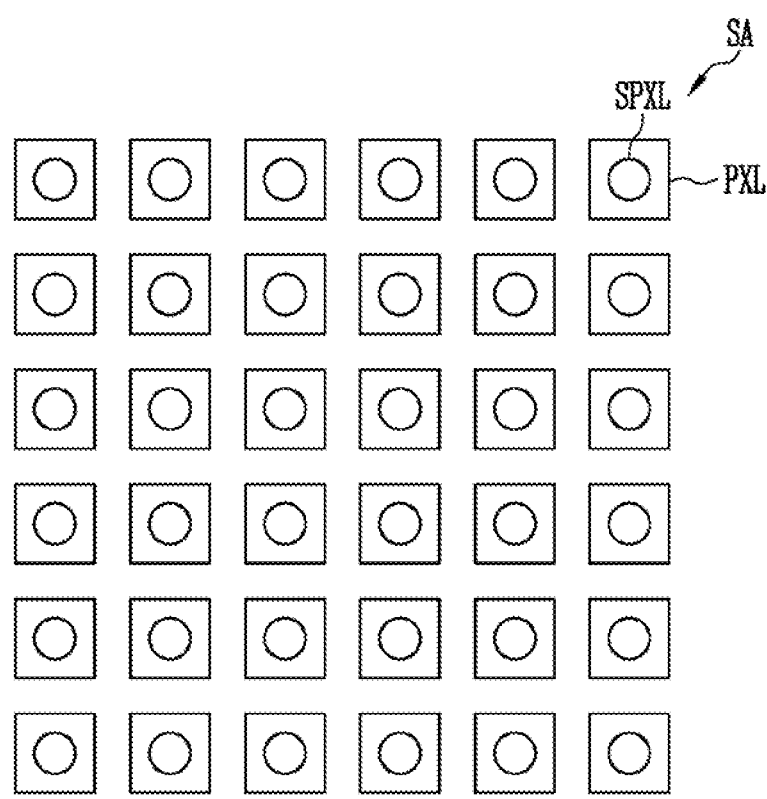

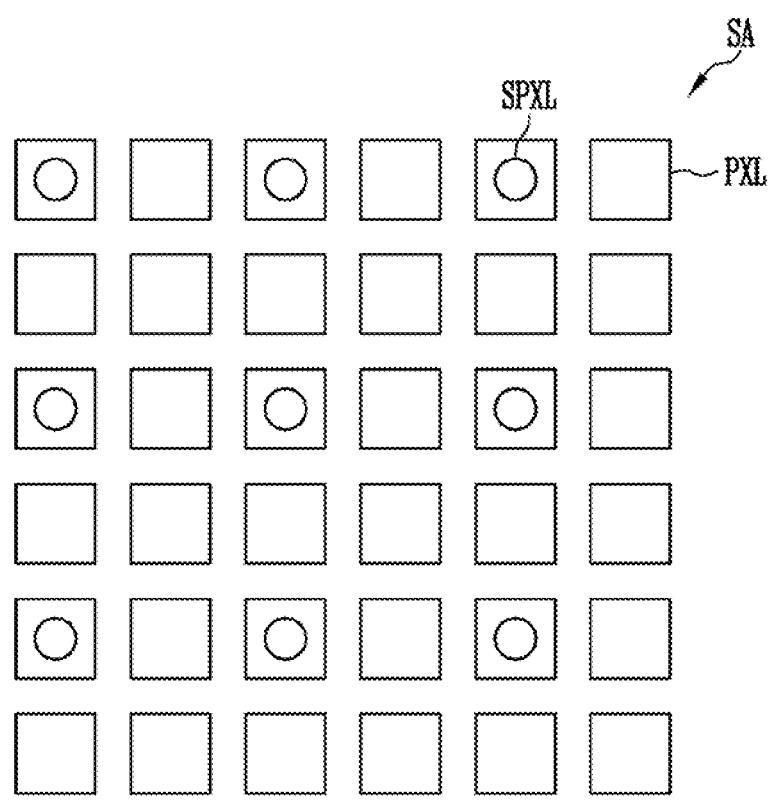

DISPLAY DEVICE INCLUDING PHOTOSENSOR UNITS

CROSS-REFERENCE TO RELATED APPLICATION

The present application claims priority under 35 U.S.C. § 119 to Korean patent application number 10-2019-0069617 filed on Jun. 12, 2019, the disclosure of which is incorporated by reference herein its entirety.

TECHNICAL FIELD

The present invention generally relates to a display device, and more particularly, to a display device inducing photosensor units.

DISCUSSION OF RELATED ART

Display devices, including smartphones and tablet personal computers (PCs), are omnipresent in today's day and age. A biometric authentication method using a fingerprint of a user has been widely used as a feature in such display devices. In order to provide a fingerprint sensing function, a fingerprint sensor may be built in or attached to a display device.

The fingerprint sensor may be, for example, a photosensitive type fingerprint sensor. The photosensitive type fingerprint sensor may include a light source, a lens, and a photo sensor array. The photo sensor array may be manufactured as, for example, a CMOS Image Sensor (CIS) or a thin film transistor (TFT) sensor.

The CIS has advantages over a TFT sensor. For example, the CIS features relatively faster processing speed than the TFT sensor, lower power consumption, and higher resolution implementation as compared to the TFT sensor by using a method of changing electrons caused by light into a voltage and outputting the voltage. However, when the CIS is applied to a large area in a display device, a cost of manufacturing the display device increases. The TFT sensor may be applied to a large area due to low price. However, only low resolution implementation is possible using a TFT sensor, and therefore, fingerprint sensing accuracy may be deteriorated.

SUMMARY

Exemplary embodiments of the present invention provide for a display device having a photosensitive type fingerprint sensor including a plurality of photo sensor units'spaced apart from each other.

According to an exemplary embodiment of the present invention, a display device is provided including a substrate. The substrate includes a display region that includes a plurality of pixels and a sensing region provided in at least one region of the display region. A circuit element layer is disposed on the substrate, the circuit element layer includes a plurality of conductive layers. A light emitting element layer is provided on the circuit element layer. The light emitting element layer includes a plurality of light emitting elements. A sensor layer is disposed on the substrate. The sensor layer includes a plurality of photo sensor units each including sensor pixels. The photo sensor units are arranged in an irregular pattern in the sensing region.

According to an exemplary embodiment of the present invention, the plurality of photo sensor units are disposed in a two-dimensional array including, a plurality of rows and a plurality of columns. At least one of the photo sensor units of the plurality of photo sensor units is not aligned in a column direction with any other photo sensor lit of the plurality of photo sensor units disposed in a most adjacent row.

According to an exemplary embodiment of the present invention, the photo sensor units are disposed on a two-dimensional array including a plurality of rows and a plurality of columns. At least one of the photo sensor units of the plurality of photo sensor units is not aligned in a row direction with any other photo sensor unit of the plurality of photo sensor units disposed in a most adjacent column.

According to an exemplary embodiment of the present invention, the distance between adjacent photo sensor units of the plurality of photo sensor units in the row direction and the column direction is 5 mm or less.

According to an exemplary embodiment of the present invention, the distance between adjacent photo sensor units of the plurality of photo sensor units in the row direction and the column direction is 5 mm or less.

According to an exemplary embodiment of the present invention, the width or diameter of the photo sensor units is 5 mm or less.

According to an exemplary embodiment of the present invention, a total area of the photo sensor units is equal to or smaller than ½ of an area of the sensing region.

According to an exemplary embodiment of the present invention, a fingerprint detector is configured to apply driving signals to the sensor pixels and receive electrical signals output from the sensor pixels.

According to an exemplary embodiment of the present invention, the fingerprint detector comprises a horizontal driver, a vertical driver, and a controller. The horizontal driver is configured to apply driving signals to the sensor pixels through driving lines. The vertical driver is configured to covert an analog signal output from the sensor pixels into a digital signal and output the digital signal. The controller is configured to generate timing signals and control the horizontal driver and the vertical driver based on the generated timing signals.

According to an exemplary embodiment of the present invention, a light blocking layer is disposed between the substrate and the circuit element layer. The light blocking layer has pin holes formed therein that allow light to selectively pass therethrough.

According to an exemplary embodiment of the present invention, the light blocking layer comprises a plurality of pin hole regions in which the respective pin holes are formed, and the pin holes are irregularly arranged in the light blocking layer.

According to an exemplary embodiment of the present invention, the pin hole regions are disposed on a two-dimensional array including a plurality of rows and a plurality of columns. At least one of the pin hole regions is not aligned in a column direction with any other pin hole region disposed in a most adjacent row.

According to an exemplary embodiment of the present invention, the pinhole regions are disposed on a two-dimensional array including a plurality of rows and a plurality of columns. At least one of the pinhole regions is not aligned in a row direction with any other pinhole region disposed in a most adjacent column.

According to an exemplary embodiment of the present invention, the pinhole regions are arranged to correspond one-to-one to the photo sensor units.

According to an exemplary embodiment of the present invention, the plurality of conductive layers include a semiconductor layer including an active pattern including at least one transistor, a first gate layer including a gate electrode that overlaps with the active pattern, a second gate layer including at least one capacitor electrode, and a source-drain layer including a source electrode and a drain electrode, which are connected to the active pattern.

According to an exemplary embodiment of the present invention, the circuit element layer comprises a plurality of light-passing regions each including light-passing holes. Each of the light-passing holes comprise multi-layered openings formed in the semiconductor layer, the first gate layer, the second gate layer, and the source-drain layer to overlap with each other.

According to an exemplary embodiment of the present invention, the light-passing regions are disposed on a two-dimensional array including a plurality of rows and a plurality of columns. At least one of the light-passing regions is not aligned in a column direction with any other light-passing region disposed in a most adjacent row.

According to an exemplary embodiment of the present invention, the light-passing regions are disposed on a two-dimensional array including a plurality of rows and a plurality of columns, wherein, at least one of the light-passing regions is not aligned in a row direction with any other light-passing region disposed in a row direction in a most adjacent column.

According to an exemplary embodiment of the present invention, the light-passing regions are arranged to correspond one-to-one to the photo sensor units.

According to an exemplary embodiment of the present invention, a display device is provided including a substrate. The substrate includes a display region that includes a plurality of pixels. A sensing, region is provided in at least one region of the display region. A circuit element layer is disposed on a first surface of the substrate. The circuit element layer includes a plurality of conductive layers, A light emitting element layer is provided on the circuit element layer. The light emitting element layer includes a plurality of light emitting elements. A plurality of pin holes are disposed in the circuit layer and/or a light blocking layer between the circuit element layer and the substrate. A sensor layer is disposed on a second surface of the substrate opposite to the first surface. The sensor layer includes a plurality of photo sensor units each including sensor pixels. At least one among the photo sensor units, the sensor pixels, and the pin holes are arranged in an irregular pattern in the sensing region. The photo sensor units at least partially overlap the pixels in a thickness direction and are configured to use at least some of the plurality of pixels disposed in the sensing region as a light source.

BRIEF DESCRIPTION OF THE FIGURES

The above and other aspects and features of the present disclosure will be more clearly understood from the following Detailed Description taken in conjunction with the accompanying drawings, in which:

FIGS. 6A, 6B, 6C, 6D and 6E are plan views illustrating various arrangements of the pixels and sensor pixels according to exemplary embodiments of the present invention;

DETAILED DESCRIPTION OF THE EMBODIMENTS

Figure 1:
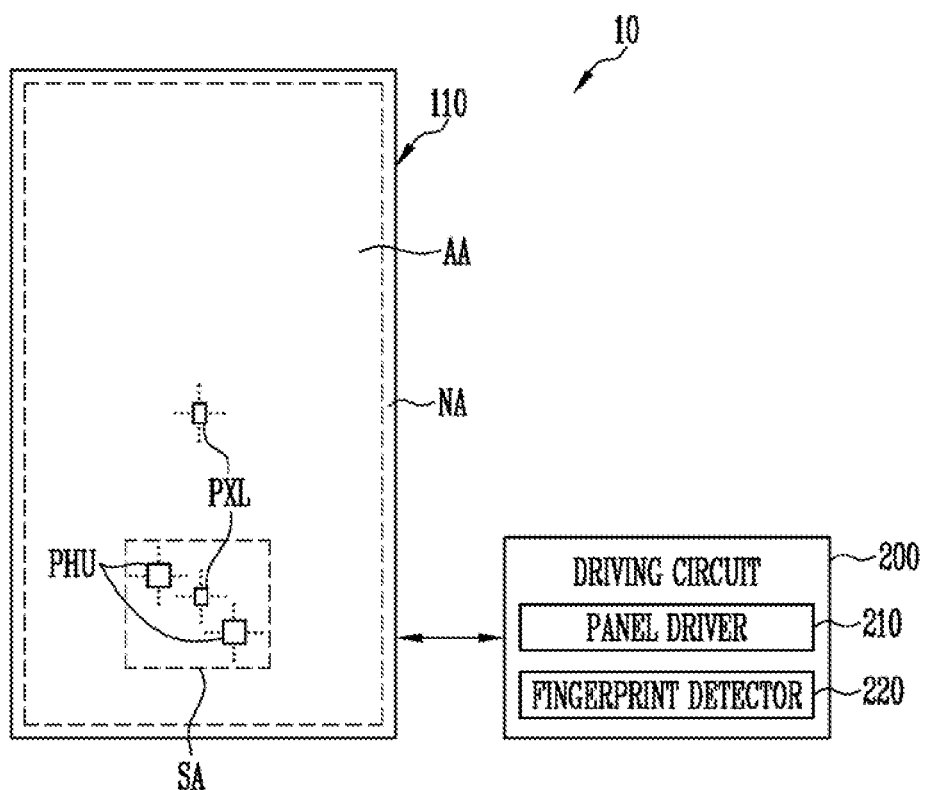
FIGS. 1 and 2 are plan views schematically illustrating a display device in accordance with exemplary embodiments of the present invention.

In the figures, dimensions may be exaggerated for clarity of illustration. It will be understood that when an element is referred to as being "between" two elements, it can be either the only element between the two elements, or one or more intervening elements may also be present.

Like reference numerals may refer to like elements throughout the Figures and Detailed Description of the Embodiments.

The term "irregular pattern" or "irregularly patterned" as used herein ma) be used to refer to a plurality of units of an element that exhibit non-uniform column density, row density size and/or spacing with respect to each other.

Figure 2:
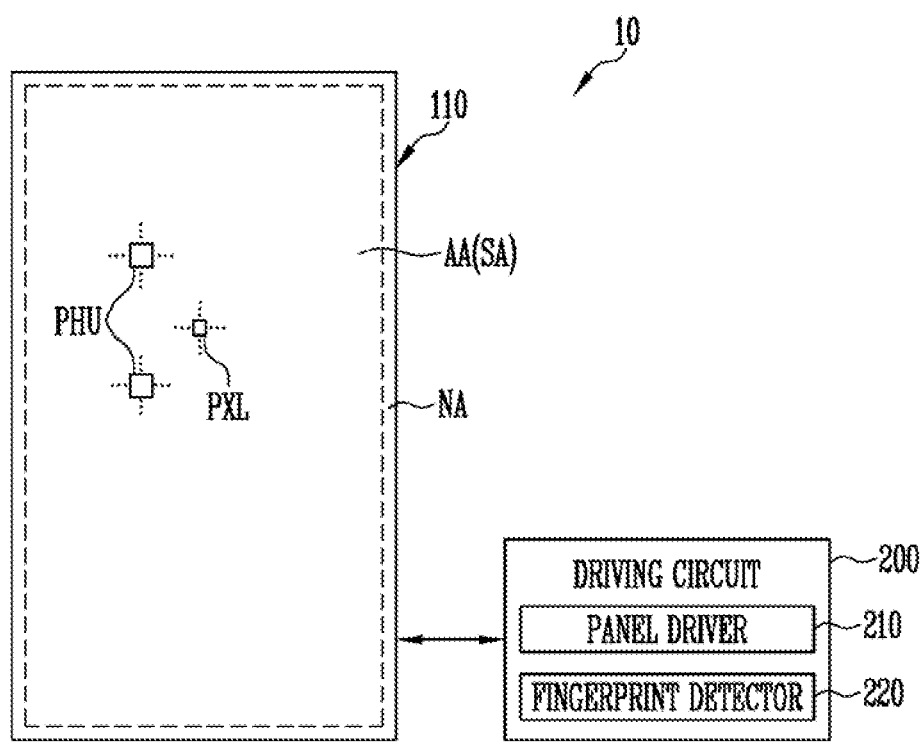

FIGS. 1 and 2 are plan views schematically illustrating a display panel 110 provided in a display device 10 and a driving circuit 200 for driving the display panel 10 in accordance with exemplary embodiments of the present invention. For convenience of illustration, the display panel 110 and the driving circuit 200 are separately illustrated in FIGS. 1 and 2, but the present invention is not limited thereto. For example, the whole or a portion of the driving circuit 200 may be integrally implemented with the display panel 110 or may be disposed on the display panel 110.

The display device 10 may be provided in various shapes. For example, the display device 10 may be provided in a rectangular plate shape having two pairs of sides parallel to, each other. The display device 10 may display, visual information (e.g., a text, a video, a picture, a two-dimensional or three-dimensional image, etc.) at a display surface thereof.

The whole or at least a portion of the display device 10 may have flexibility. For example, the display device 10 may have flexibility throughout the entirety of the display device 10, or may only have flexibility in a region corresponding to a designated flexible region of the display device 10.

Referring to FIGS. 1 and 2, the display device 10 comprises the display panel 110 and the driving circuit 200 for driving the display panel 110.

The display panel 110 comprises a display region AA and a non-display region NA. The display region AA is a region in which a plurality of pixels PXL (also may be referred to herein as sub-pixels) are provided. The display region AA may also be referred to herein as an active region of the display panel 110. In an exemplary embodiment of the present invention, each of the pixels PXL may include at least one light emitting element. The display device 10 drives the pixels PXL corresponding to received image data input, thereby displaying an image in the display region AA of the display panel 110.

In an exemplary embodiment of the present invention, the display region AA may include a sensing region SA. The sensing region SA may include at least some pixels PXL among the pixels PXL provided in the display region AA.

In an exemplary embodiment of the present invention, as shown in FIG. 1, at least a portion of the display region AA may also function as the sensing region SA.

In the exemplary embodiment of the present invention shown in FIG. 2, the entire display region AA may also function as the sensing region SA.

In exemplary embodiment of the present invention, a plurality of sensing regions SA that are regularly or irregularly arranged may be formed on the display region AA. The term "irregularly arranged" may refer to a non-uniform alignment, size, spacing, column density, and/or row density of sensing regions SA. The plurality of sensing regions SA may also have various areas and shapes which may be identical to or different from each other.

Although an example is illustrated in FIG. 1 in which a singular sensing region SA is formed in at least a portion of the display region AA, the scope of the present invention is not limited thereto. For example, the display region AA and the sensing region SA may be provided to overlap with each other in only a partial region.

According to an exemplary embodiment of the present invention, the sensing region SA may at least partially overlap a non-display region NA of the display device 10.

The non-display region NA is a region disposed at the periphery of the display region AA, and may be referred to as a non-active region. For example, the non-display region NA may be a region that at least partially surrounds the perimeter of the display region AA in a plan view. In an exemplary embodiment of the present invention, the non-display region NA may include a line region, a pad region, various dummy regions, and the like.

In an exemplary embodiment of the present invention, the display device 10 may further include a plurality of photo sensor units PHU provided in the sensing region SA. The photo sensor units PHU may include at least one sensor pixel for sensing light.

In an exemplary embodiment of the present invention, when light emitted from a light source provided in the display device 10 is reflected off of an external object, such as a finger of a user, the sensor pixels may sense the reflected light and output an electrical signal (e.g., a voltage signal) corresponding to the reflected light. The electrical signal may then be transferred to the driving circuit 200, which will be described later on herein, to be used for fingerprint sensing. Hereinafter, although an example in which the photo sensor units PHU are used for fingerprint sensing is described, the photo sensor units PHU may be used to perform various functions of a touch sensor, a scanner, or the like.

In an exemplary embodiment of the present invention, the photo sensor units PHU may be arranged in an arbitrary pattern on the sensing region SA to be spaced apart from each other. For example, the photo sensor units PHU may be arranged on a two-dimensional array comprising a plurality of rows and a plurality of columns.

As for at least some of the photo sensor units PHU, any other photo sensor unit PHU on a most adjacent row might not be disposed in a column direction. Alternatively, as for some of the photo sensor units PHU, any other photo sensor unit PHU on a most adjacent column might not be aligned in a row direction. The photo sensor units PHU may be configured as a plurality of sensor pixels. When the photo sensor units PHU are arranged on the sensing region SA, the sensor pixels may overlap with the pixels PXL or may be disposed at the periphery of the pixels PXL. For example, some or all of the sensor pixels may overlap with the pixels PXL or may be disposed between the pixels PXL. Various exemplary embodiments of the present invention depicting arrangements of the sensor pixels and the pixels PXL will be described in more detail herein with reference to FIGS. 6A, 6B, 6C, 6D and 6E.

In an exemplary embodiment of the present invention in which the photo sensor units PHU overlap with the pixels PXL, the photo sensor units PHU may use, as a light source, a light emitting element provided in each pixel PXL. Therefore, the photo sensor units PHU along with the light emitting elements provided in the pixels PXL may comprise, for example, a photosensitive type sensor (e.g., a fingerprint sensor). As described above, when a display device having a built-in fingerprint sensor is configured using the pixels PXL as light sources, without any external light source, the module thickness of the photosensitive type fingerprint sensor and the display device having the same can be decreased, and manufacturing cost can be reduced.

According to an exemplary embodiment of the present invention, the photo sensor units PHU may be arranged on a first surface (e.g., a rear surface) of the display panel 110 facing a second surface (e.g., a front surface) of the display panel 110 on which an image is displayed. However, the present invention is not limited thereto.

The driving circuit 200 may transmit a driving signal for driving the display panel 110. For example, the driving circuit 200 may output a data signal corresponding to image data for driving the pixels PXL, to the display panel 110 and/or may output a driving signal for driving the photo sensor units PHU. The driving circuit 200 may receive electrical signals (e.g., voltage signals received from the photo sensor units PHU). The driving circuit 200 may detect the shape and/or contours of the fingerprint of the user by analyzing the received electrical signals.

In an exemplary embodiment of the present invention, the driving circuit 200 may include a panel driver 210 and a fingerprint detector 220. Although the panel driver 210 and the fingerprint detector 220 are shown as separated from each other in FIGS. 1 and 2, the scope of the present invention is not limited thereto. For example, at least a portion of the fingerprint detector 220 may be integrated with the panel driver 210 or operate in connection with the panel driver 210.

The panel driver 210 may supply a data signal corresponding to image data to the pixels PXL while sequentially scanning the pixels PXL of the display region AA. Then, the display panel 110 may display an image corresponding to the image data.

In an exemplary embodiment of the present invention, the panel driver 210 may supply a driving signal to initiate fingerprint sensing to the pixels PXL. The driving signal may be provided to allow the pixels PXL to operate as light sources for the photo sensor units PHU by emitting light. For example, the light emitted from at least one of the pixels PXL may be transmitted in a direction substantially perpendicular to a plane of the display area AA. The emitted light may subsequently be reflected off of an external object, and the reflected light may then be detected by the photo sensor units PHU disposed in the sensing region SA. Therefore, the driving signal for fingerprint sensing may be provided to the pixels PXL provided in the display region AA of the display panel 110 (e.g., pixels PXL provided in the sensing region SA). In an exemplary embodiment of the present invention, the driving signal for fingerprint sensing may be provided by the fingerprint detector 220.

The fingerprint detector 220 may transfer a driving signal for driving the sensor pixels SPXL to the photo sensor units PHU, and detect a fingerprint of a user, based on electrical signals received from the sensor pixels SPXL of the photo sensor units PHU.

Figure 3:
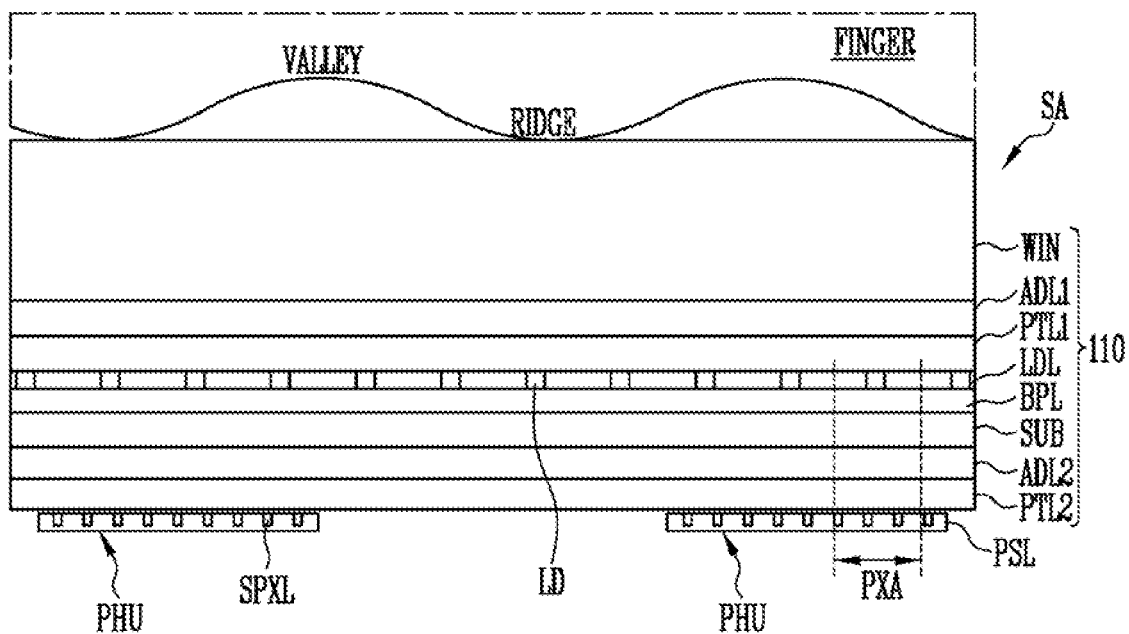
FIG. 3 is a cross-sectional view of a display device according to an exemplary embodiment of the present invention.

FIG. 3 is a cross-sectional view of the display device 10 shown in FIGS. 1 and 2. For example, FIG. 3 illustrates a cross-section in the sensing region SA of the display device 10 shown in FIGS. 1 and 2.

Referring to the cross-section of FIG. 3, the sensing region SA of the display device 10 may include the display panel 110 and a sensor layer PSL disposed on the display panel 110 in the sensing region SA. Also, the display device 10 may include a substrate SUB, a circuit element layer BPL, a light emitting element layer LDL, a first protective layer PTL1, a first adhesive layer ADL1, and a window WIN, which may be sequentially disposed on a second surface (e.g., the front surface) of the substrate SUB. Also, the display device 10 may include a second adhesive layer ADL2 and a second protective layer PTL2, which are sequentially disposed on a first surface (e.g., a rear surface) of the substrate SUB in the sensing region SA.

The substrate SUB is a base substrate of the display panel 110, and may be a substantially transparent transmissive substrate. The substrate SUB may be a rigid substrate comprising glass and/or tempered glass, or a flexible substrate including plastic. However, the material of the substrate SUB is not limited thereto, and the substrate SUB may be made of various materials.

The substrate SUB may include a display region AA and a non-display region NA, as shown in FIGS. 1 and 2. In addition, the display region AA may include a plurality of pixel regions PXA in which the respective pixels PXL are disposed and/or formed.

The circuit element layer BPL may be disposed on the second surface (e.g., the front surface) of the substrate SUB, and may include at least one conductive layer. For example, the circuit element layer BPL may include a plurality of circuit elements constituting pixel circuits of the pixels PXL and lines for supplying various power sources and signals for driving the pixels PXL. The circuit element layer BPL may include various types of circuit elements such as at least one transistor and at least one capacitor, and a plurality of conductive layers for constituting lines connected to the circuit elements. Also, the circuit element layer BPL may include at least one insulation layer provided between the plurality of conductive layers. Also, the circuit element layer BPL may include a line pan disposed in the non-display region NA of the substrate SUB to supply corresponding power sources and corresponding signals to lines connected to the pixels PXL.

The light emitting element layer LDL may be disposed on a second surface (e.g., a front surface) of the circuit element layer BPL. The light emitting element layer LDL may include a plurality of light emitting elements LD connected to the circuit elements and/or the lines of the circuit element layer BPL through contact holes, etc. In an exemplary embodiment of the present invention, at least one light emitting element LD of the plurality of light emitting elements LD may be disposed in each of the pixel regions PXA.

Each of the pixels PXL may include circuit elements disposed in the circuit element layer BPL and at least one light emitting element LD disposed in the light emitting element layer LDL on the second surface (e.g., a front surface) of the circuit element layer BPL. A structure of the pixel PXL will be described in detail later on herein.

The first protective layer PTL1 may be disposed on the second surface (e.g., the front surface) of the light emitting element layer LDL to cover the display region AA. The first protective layer PTL1 may include an encapsulating member such as a thin film encapsulation (TFE) layer or an encapsulation substrate, and additionally include a protective film, and the like in addition to the encapsulating member.

The first adhesive layer ADL1 is disposed cm the second surface (e.g., the front surface) of the substrate SUB between the first protective layer PTL1 and the window WIN. The first adhesive layer ADL1 may couple the first protective layer PTL1 and the window WIN to each other. The first adhesive layer ADL1 may include a transparent adhesive, such as an optically clear adhesive (OCA). The first adhesive layer ADL1 may include various adhesive materials in addition to the transparent adhesive.

The window WIN is a protective member disposed at a module uppermost portion of the display device 10 comprising the display panel 110, and may be a substantially transparent transmissive substrate. The window WIN may have a multi-layered structure including, a glass substrate, a plastic film and/or a plastic substrate. The window WIN may include a rigid or flexible substrate, and the material constituting the window WIN is not particularly.

In an exemplary embodiment of the present invention, the display device 10 may further include a polarizing plate and/or a touch sensor layer (e.g., a touch electrode layer). For example, the display device 10 may further include a polarizing plate and/or a touch sensor layer, disposed between the first protective layer PTL1 and the window WIN.

The second protective layer PTL2 may be disposed on the first surface (e.g., the rear surface) of the substrate SUB. The second protective layer PTL2 may be coupled to the substrate SUB by the second adhesive layer ADL2. For example, the second adhesive layer ADL2 may firmly couple the first surface (e.g., the rear surface) of the substrate SUB and a second surface (e.g., a front surface) of the second protective layer PTL2 to each other. The second adhesive layer ADL2 may include a transparent adhesive, such as an OCA. The second adhesive layer ADL2 may include a pressure sensitive adhesive (PSA) in which an adhesive material acts when pressure fir allowing the second adhesive layer ADL2 to be adhered to an adhesive surface is applied. When the second adhesive layer ADL2 comprises the PSA, the second adhesive layer ADL2 may be attached to the adhesive surface by using pressure without separate thermal treatment or UV treatment at room temperature.

The second protective layer PTL2 may prevent external oxygen and moisture from contaminating the display panel 110, and may be provided in the form of a single layer or multi-layer structure. The second protective layer PTL2 may be provided as a film, to further preserve flexibility of the display panel 110. The second protective layer PTL2 may be coupled to the sensor layer PSL through another adhesive layer comprising a transparent adhesive, such as an OCA.

In an exemplary embodiment of the present invention, a selective light blocking film may be further provided on a first surface (e.g., a rear surface) of the second protective layer PTL2. The selective light blocking film may block a specific frequency region (e.g., ultraviolet light included in external light incident to the display device 10), to prevent the ambient light from reaching the photo sensor units PHU. Although a case where the selective light blocking film is further provided on the first surface (e.g., thereat surface) of the second protective layer PTL2 is described above, the present invention is not limited thereto. According to an exemplary embodiment of the present invention, the selective light blocking film may be provided in any layer of the display device 10 as long as the selective light blocking film is disposed on a second surface (e.g., a front surface) of the sensor layer PSL. For example, the selective light blocking, film may be disposed in any layer of the display panel 110 provided that it is disposed between the window WIN and the second surface e.g., the front surface) of the sensor layer PSL. When a component for blocking the ultraviolet light is included in the display panel 110, the selective light blocking film may be omitted.

The sensor layer PSL may be attached to a first surface (e.g., the rear surface) of the display panel 110 through an adhesive, etc. to overlap with at least one region of the display panel 110. The sensor layer PSL may be disposed to overlap with the display panel 110, for example, in the sensing region SA. The sensor layer PSL may include a plurality of photo sensor units PHU dispersed at a predetermined resolution and/or a predetermined distance.

The photo sensor units PHU may have a sufficient number, size, and arrangement such that a fingerprint detected can be identified from associated voltage signals output by the photo sensor units PHU.

In an exemplary embodiment of the present invention, each of the photo sensor units PHU may have various shapes such as a quadrangular shape, a circular shape, an elliptical shape, and a polygonal shape. In an exemplary embodiment of the present invention, the maximum width and/or diameter of each of the photo sensor units PHU may be about 5 mm or less. However, the present invention is not limited thereto.

The photo sensor units PHU may be arranged in the sensor layer PSL to be spaced apart from each other. The photo sensor units PHU may be arranged in an irregular pattern. For example, the photo sensor units PHU may be arranged on a two-dimensional array comprising a plurality of rows and a plurality of columns. As for at least some of the photo sensor units PHU, any other photo sensor unit PHU in a most adjacent row might not be aligned in a column direction. Alternatively, as for at least one photo sensor units PHU, any other photo sensor unit PHU disposed in a most adjacent column might not be aligned in a row direction.

The distance between adjacent photo sensor units PHU in a row direction and a column direction may be, for example, about 5 mm or less. In an exemplary embodiment of the present, the distance between photo sensor units PHU aligned in a row direction may be about 2 mm to about 3 mm. In addition, the distance between photo sensor units PHU aligned in a column direction may be about 2 mm to about 3 mm. However, the distance between the photo sensor units PHU in accordance with the present invention is not limited to the above-described numerical values.

When the photo sensor units PHU are arranged in the sensing region SA to be spaced apart from each other as described above, the area in which the photo sensor units PHU are arranged in the sensing region SA may be decreased. For example, the total area of the photo sensor units PHU may be equal to or smaller than ½ of the area of the sensing region SA, but the present invention is not limited thereto.

An arrangement pattern of the photo sensor unit PHU will be described in more detail below with reference to FIGS. 7, 8 and 9.

The photo sensor units PHU may include a plurality of sensor pixels SPXL that output a corresponding electrical signal, e.g., a voltage signal by sensing incident light. The sensor pixels SPXL may be densely arranged such that light reflected from an object (e.g., a fingerprint or the like) can be incident to at least two adjacent sensor pixels SPXL.

Reflected light received by the respective sensor pixels SPXL may have different optical characteristics (e.g., frequencies, wavelengths, sizes, etc.), based on whether the reflected lights are reflected off of valleys or ridges of the finger of a user. Therefore, the sensor pixels SPXL may output voltage signals having different electrical characteristics, corresponding to the optical characteristics of the reflected lights. The voltage signals output by the sensor pixels SPXL may be converted into image data by the fingerprint detector 220, to be used for fingerprint identification of the user.

As described above, the display device 10 has a fingerprint sensor comprising the light emitting element layer LDL and the sensor layer PSL. The light emitting element layer LDL may include the light emitting elements LD capable of serving as a light source of a photosensitive type fingerprint sensor. The sensor layer PSL may include the photo sensor units PHU for receiving reflected light that is emitted from the light emitting element layer LDL and then reflected off of an external object (e.g., the fingerprint region of the finger) located on the second surface (e.g., a front surface) of the display device 10.

The display device 10 uses the light emitting elements LD of the pixels PXL as the light source of the fingerprint sensor, but the present invention is not limited thereto. For example, a display device 10 in accordance with an exemplary embodiment of the present invention may have a separate light source for fingerprint sensing from the light emitting elements LD of the pixels PXL.

The fingerprint sensing method of the display device 10 in accordance with the above-described exemplary embodiments of the present invention will be briefly described as follows. During a fingerprint sensing period in which the photo sensor units PHU are activated, the pixels PXL (particularly, the light emitting elements LD provided in the pixels PXL) of the display region AA may emit light in a state in which a finger (e.g., a fingerprint region) of a user is in contact with the display region AA or comes within a predetermined distance (e.g., hovers) over the display region AA. For example, all the pixels PXL of the display region AA may simultaneously or sequentially emit light during the fingerprint sensing period. Alternatively, only some pixels PXL among the pixels PXL of the display region AA may emit light at a predetermined distance, or only some pixels PXL of a specific color (e.g., short-wavelength light, such as blue light) may selectively emit light. For example, during the fingerprint sensing period, only pixels PXL disposed in the sensing region SA may be active. The photo sensor units PHU may be simultaneously or sequentially driven during the fingerprint sensing period.

Some light emitted from the pixels may be reflected from the finger of the user into the photo sensor units PHU. A fingerprint shape (e.g., a fingerprint pattern) of the user may be detected based on differences in light amount and/or waveforms of reflected lights respectively reflected from ridges and valleys of the fingerprint.

Figure 4:
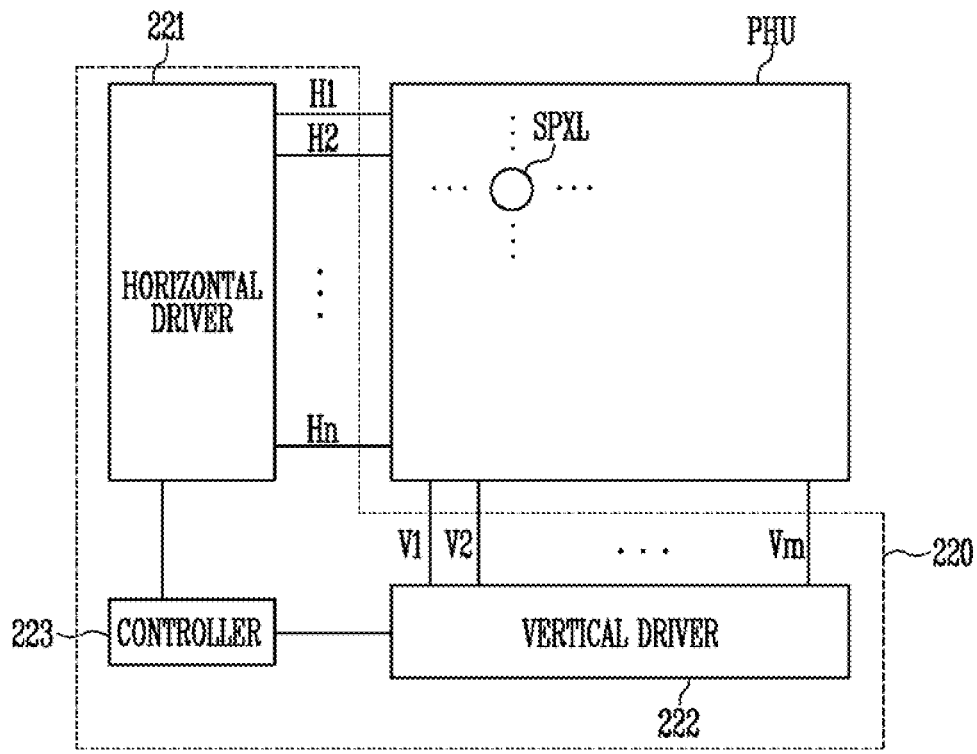
FIG. 4 is a plan view schematically illustrating a configuration of a photo sensor unit including sensor pixels and a fingerprint detector in accordance with an exemplary embodiment of the present inventive concept.

FIG. 4 is a plan view illustrating a configuration of the photo sensor unit PHU and the fingerprint detector 220 in accordance with an exemplary embodiment of the present invention.

The photo sensor unit PHU may include an array of sensor pixels SPXL. In an exemplary embodiment of the present invention, the sensor pixels SPXL may be arranged in a two-dimensional array, but the present invention is not limited thereto. Each of the sensor pixels SPXL may include a photoelectric device that converts incident light into electric charges according to properties of the incident light.

The fingerprint detector 220 may include a horizontal driver 221, a vertical driver 222, and a controller 223.

The horizontal driver 221 may be connected to the sensor pixels SPXL through driving lines H1 to Hn. The horizontal driver 221 may comprise a shift register, an address decoder, or the like. In an exemplary embodiment of the present invention, the horizontal driver 221 may apply a driving signal to drive selected sensor pixels SPXL among the sensor pixels SPXL. For example, the horizontal driver 221 may transmit a driving signal to units of sensor pixel rows. The horizontal driver 221 may include a reset unit for resetting unnecessary electric charges stored in the sensor pixels SPXL.

Sensor pixels SPXL driven by the horizontal driver 221 may sense light by using photoelectric devices provided therein, and output an electrical signal (e.g., a voltage signal) corresponding to the sensed light. The output electrical signal may be, for example, an analog, signal.

The vertical driver 222 may be connected to the sensor pixels SPXL through signal lines V1 to Vm. The vertical driver 222 may perform processing on a signal output from the sensor pixels SPXL.

The vertical driver 222 may perform, for example, correlated Double Sampling (CDS) processing for eliminating noise from a received electrical signal. Also, the vertical driver 222 may convert an analog signal received from the sensor pixel SPXL into a digital signal. In an exemplary embodiment of the present invention, an analog-digital conversion device may be provided for each sensor pixel column to process, in parallel, analog signals received from the sensor pixel column.

The vertical driver 222 may be further connected to a shift register, an address decoder, or the like. The vertical driver 222 may sequentially select a processing circuit (e.g., an analog-digital conversion device) corresponding to the sensor pixel column. An electrical signal (e.g., a digital signal) processed from the processing circuit selected by the vertical driver 222 may be output.

The controller 223 may be connected to a timing generator or the like, which generates various timing signals, and controls the horizontal driver 221 and the vertical driver 222 based on the timing signals generated by the corresponding timing generator.

In an exemplary embodiment of the present invention, the controller 223 may generate image data from an electrical signal (e.g., a digital signal received from the vertical driver 222) and perform processing on the generated image data. The controller 223 may detect a fingerprint from the processed image data, or authenticate the detected fingerprint and/or transmit the detected fingerprint externally. However, the generation of the image data and the detection of the fingerprint might not be performed by the controller 223, but may be performed by an external host processor, etc. Therefore, the controller 223 may directly transfer the electrical signal (e.g., the digital signal received from the vertical driver 222) to the external host processor, or transfer the electrical signal (e.g., the digital signal received from the vertical driver 222) to the external host processor via the panel driver 210, etc.

Figure 5:
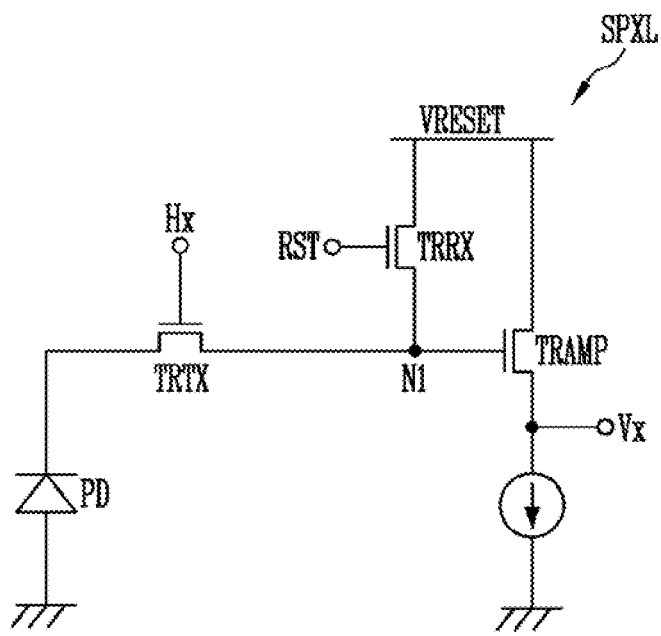
FIG. 5 is a circuit diagram illustrating the sensor pixels shown in FIG. 4, according to at exemplary embodiment of the present invention.

FIG. 5 is a circuit diagram illustrating an exemplary embodiment of the sensor, pixels SPXL shown in FIG. 4. In FIG. 5, a sensor pixel SPXL is illustrated as a sensor pixel having a 3-transistor structure.

Referring to FIG. 5, the sensor pixel SPXL comprises a photo diode PD as an example of the photoelectric device, a transmission transistor TRTX, a reset transistor TRRX, and an amplification transistor TRAMP. In FIG. 5, an example in which the transistors are implemented with an N-type transistor is illustrated. However, in an exemplary embodiment of the present invention, at least some of the transistors may be implemented with a P-type transistor, and corresponding to this, the circuit structure of the sensor pixel SPXL may be accordingly modified.

An anode electrode of the photo diode PD may be grounded. The transmission transistor TRTX may be connected between a cathode electrode of the photo diode PD and a first node N1, and a gate electrode of the transmission transistor TRTX may be connected to the horizontal driver 221. The transmission transistor TRTX may be turned on when a driving signal may be applied through a driving litre Hx, to operate as a transmission gate unit that transfers electric charges converted from reflected light in the photo diode PD to the first node N1 as an electric charge voltage converter.

The reset transistor TRRX may be connected between a reset power source VRESET and the first node N1, and may receive a reset signal applied through a gate electrode thereof. The reset transistor TRRX may be turned on when the reset signal is applied, to reset a voltage of the first node N1 as a voltage of the reset power source VRESET.

The amplification transistor TRAMP may be connected between the reset power source VRESE1 and a signal line Vx, and a gate electrode of the amplification transistor TRAMP may be connected to the first node N1. The amplification transistor TRAMP may operate as an amplifier that outputs a signal corresponding to the voltage of the first node N1 to the signal line Vx.

However, the structure of the sensor pixel SPXL is not limited to that described above and the sensor pixel SPXL may be variously modified to have, for example, a 4-transistor structure, and the like.

FIGS. 6A, 6B, 6C, 6D and 6E are plan views illustrating exemplary embodiments of an arrangement structure of pixels PXL and sensor pixels SPXL. FIGS. 6A, 6B, 6C, 6D and 6F illustrate various embodiments of relative size, resolution, and arrangement relationships between at least one pixel PXL and sensor pixels SPXL, which are provided in the sensing region SA.

In the exemplary embodiments of the present invention depicted with reference to FIGS. 6A, 6B, 6C, 6D and 6E, the sensor pixels SPXL may comprise at least one of the sensor pixels SPXL provided in each photo sensor unit PHU. Arrangement relationships between sensor pixels SPXL in one region of the photo sensor unit PHU and the pixels PXL are illustrated in FIGS. 6A, 6B, 6C, 6D and 6E.

Referring to FIG. 6A, the sensor pixels SPXL may be arranged with the same resolution as the pixels PXL (e.g., a same density). For example, the sensor pixels SPXL in the photo sensor unit PHU may be arranged with a same resolution as the pixels PXL on the display panel 110 and may be correspondingly disposed.

The pixels PXL and the sensor pixels SPXL may be arranged in pairs. In FIG. 6A, an exemplary embodiment in which the pixels PXL and the sensor pixels SPXL are arranged to overlap with each other is shown. For example, each photo sensor unit PHU may be completely overlapped by a corresponding pixel PXL in a plan view. However, in an exemplary embodiment of the present invention, the pixels PXL and the sensor pixels SPXL may be arranged not to overlap with each other, or to overlap with each other only in a designated region of the display device 10.

Although a case in which the sensor pixels SPXL have a size smaller than that of the pixels PXL is illustrated in FIG. 6A, the present invention is not limited thereto. For example in an exemplary embodiment of the present invention, the sensor pixels SPXL may have a size equal to or larger than that of the pixels PXL, in a plan view.

Referring to FIGS. 6B, 6C, 6D and 6E, the sensor pixels SPXL may be arranged with a resolution lower than the resolution of the pixels PXL. For example, the sensor pixels SPXL in the photo sensor unit PHU may be arranged with a resolution lower than the resolution of the pixels PXL on the display panel 110. Although an example in which one sensor pixel SPXL is disposed per square comprised of four pixels PXL (e.g., one sensor pixel SPXL per 2×2 grid of pixels PXL) is illustrated in FIGS. 6B, 6C, 6D and 6E, the present invention is not limited thereto.

Figure 6C:
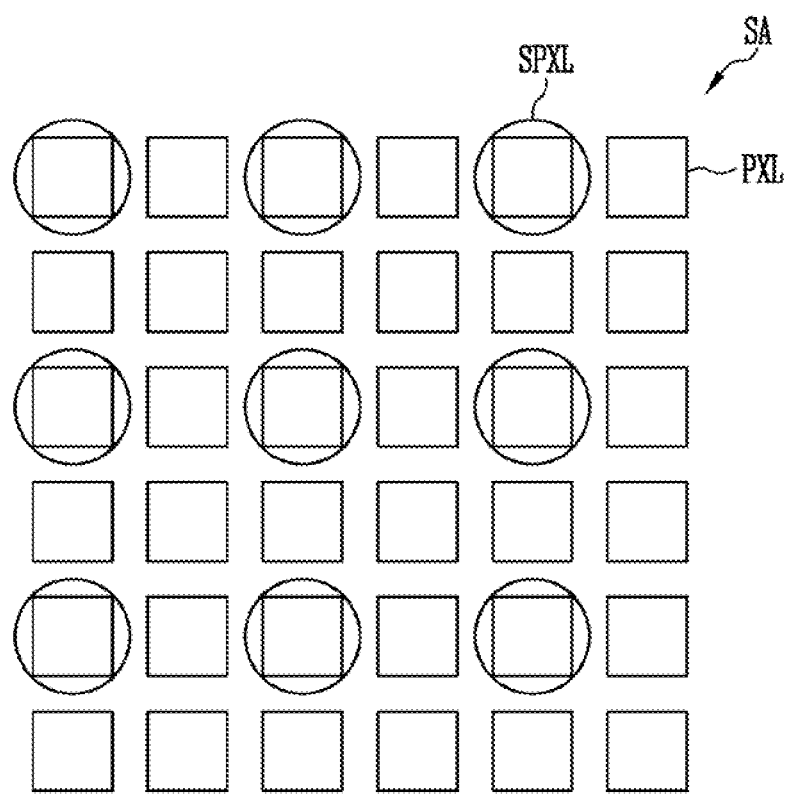
Figure 6D:
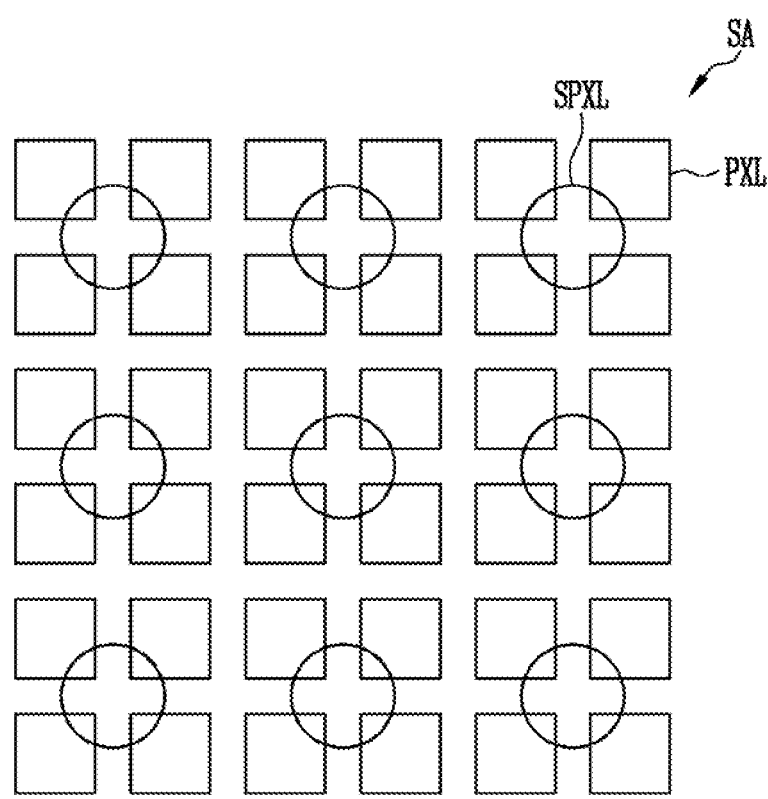
Figure 6E:
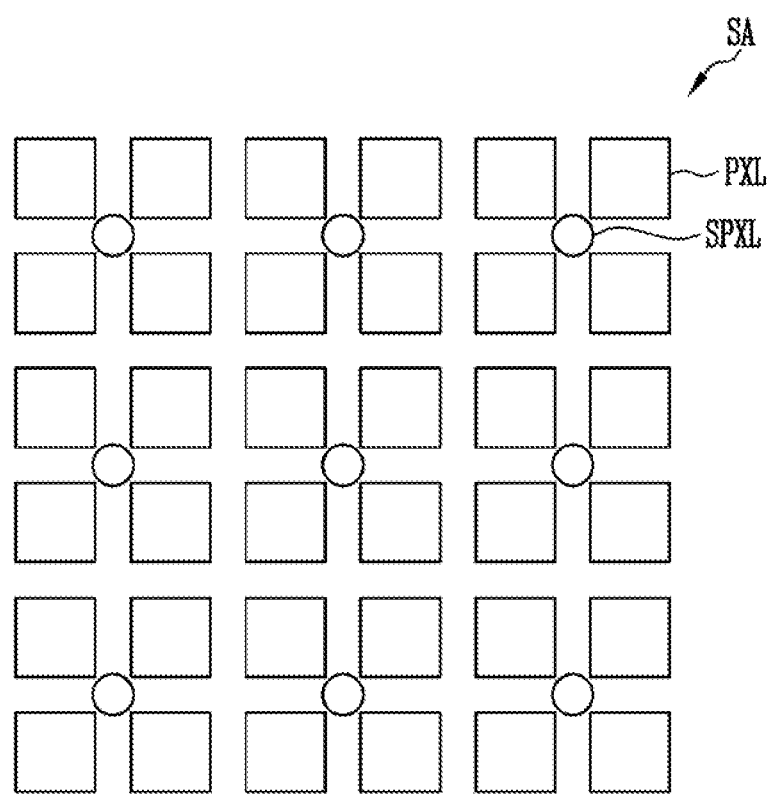

The sensor pixels SPXL may have a size smaller than the size of the pixels PXL as shown in FIGS. 6B and 6E. Alternatively the sensor pixels SPXL may have a size larger than the size of the pixels PXL as shown in FIGS. 6C and 6D.

When the sensor pixels SPXL are arranged with a resolution lower than the resolution of the pixels PXL, some or all of the sensor pixels SPXL may be arranged to overlap with the pixels PXL. For example, the sensor pixels SPXL may be only partially overlapped by pixels PXL as shown in FIGS. 6C and 6D.

As shown in FIG. 6D, the sensor pixels SPXL may be disposed between the pixels PXL to partially overlap with the pixels PXL. For example, the sensor pixel SPXL associated with each 2×2 square grid of adjacent pixels PXL may overlap the four adjacent corners thereof. Therefore, the sensor pixels SPXL may have a size larger than the size of the pixels PXL, as shown in FIG. 6D. For example, the sensor pixels SPXL may have a size large enough to entirely cover at least one pixel PXL.

Alternatively, the sensor pixels SPXL might not overlap with the pixels PXL as shown in FIG. 6E. For example, the sensor pixel SPXL associated with each 2×2 square grid of adjacent pixels PXL may be disposed at the center of adjacent corners of the adjacent pixels PXL without being overlapped thereby.

The arrangement structure between the pixels PXL and the sensor pixels SPXL is not limited to those exemplary embodiments described above. For example, the shapes, arrangements, relative sizes, numbers, and resolutions of the pixels PXL and the sensor pixels SPXL may be variously modified. Also, in an exemplary embodiment of the present invention, the pixels PXL and the sensor pixels SPXL may be arranged in a form obtained by combining one or more of the embodiments shown in FIGS. 6A, 6B, 6C, 6D and 6E.

Although an example in which the sensor pixels SPXL are regularly arranged in the photo sensor unit PHU is illustrated in FIGS. 6A, 6B, 6C, 6C, 6D and 6E, the present invention is not limited thereto. According to an exemplary embodiment of the present invention, the sensor pixels SPXL may be arranged in an irregular pattern in the photo sensor unit PHU.

As described above, alignment is not required between the sensor pixels SPXL in the photo sensor unit PHU and the pixels PXL provided on the display panel, and hence the photo sensor units PHU can be attached to a first surface (e.g., the rear surface) of the display panel 110 without any separate alignment process in a manufacturing process of the display device 10. Thus, the display device 10 in accordance with the present invention can be easily manufactured.

Figure 7:
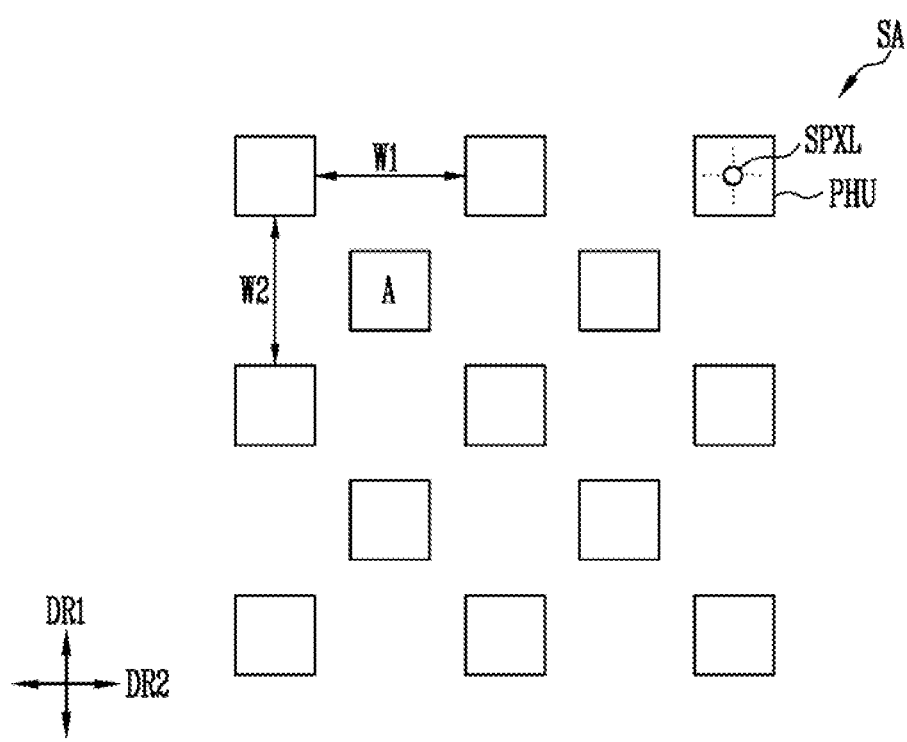
FIGS. 7, 8 and 9 are plan views illustrating various arrangements of photo sensor units according to exemplary embodiments of the present invention.
Figure 8:
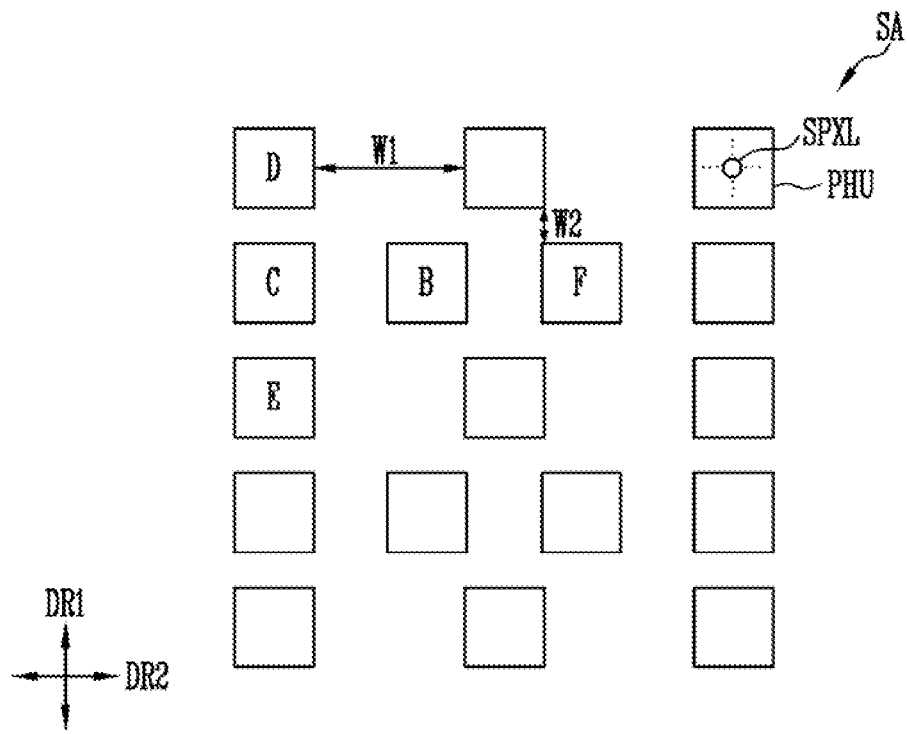
Figure 9:
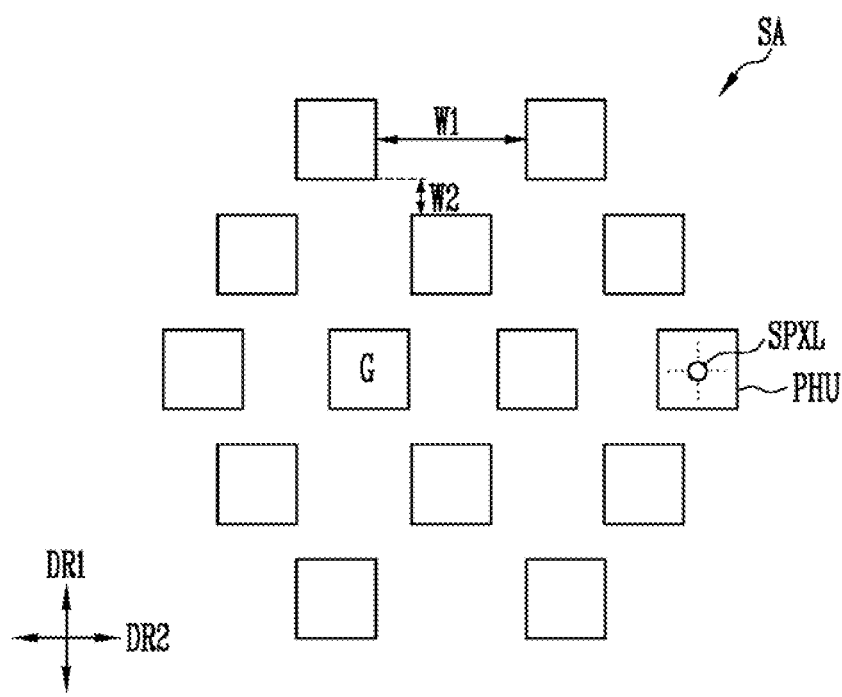

FIGS. 7, 8 and 9 are plan views illustrating various arrangements of photo sensor units according to exemplary embodiments of the present invention.

In various embodiments of the present invention, the display device 10 may include a plurality of photo sensor units PHU arranged in the sensing region SA. Each of the photo sensor units PHU may include a plurality of sensor pixels SPXL.

In an exemplary embodiment of the present invention, each of the photo sensor units PHU may have various shapes such as a quadrangular shape, a circular shape, an elliptical shape, and a polygonal shape. In an exemplary embodiment of the present invention, the maximum width or diameter of each of the photo sensor units PHU may be about 5 mm less. However, the present invention is not limited thereto.

The photo sensor units PHU may be arranged in the sensing region SA to be spaced apart from each other, and may be arranged in a regular or irregular pattern in the sensing region SA. For example, the photo sensor units PHU may be arranged on a two-dimensional array comprising a plurality of rows and a plurality of columns.

As for at least one of the photo sensor units PHU, any other photo sensor unit PHU disposed in a most adjacent row might not be aligned in a column direction (e.g., a direction). Alternatively, as for at least one of the photo sensor units PHU, an other photo sensor unit PHU in a most adjacent column might not be aligned in a row direction (e.g., a DR2 direction). For example, the photo sensor unit PHU may have a staggered arrangement in a plan view.

For example, referring to FIG. 7, any other photo sensor unit PHU disposed in a most adjacent row to the at least one photo sensor unit PHU is not aligned in the column direction (e.g., a DR1 direction). In addition, any other photo sensor unit PHU disposed in a most adjacent column is not aligned in the row direction (e.g., a DR2 direction) of the at least one photo sensor unit PHU. For example, the photo sensor units PHU may have a staggered arrangement in a plan view.

According to an exemplary embodiment of the present invention, adjacent photo sensor units PHU disposed in the column direction (e.g., the DR1 direction) and the row direction (e.g., the DR2 direction) may be spaced by distances W1 and W2 respectively. Distances W1 and W2 may be substantially equal or different from one another. A distance between photo sensor units PHU diagonally arranged in a direction defined between the column direction (e.g., the DR1 direction) and the row direction (e.g., the DR2 direction) may be smaller than the distances W1 and W2. In an exemplary embodiment of the present invention, when photo sensor unit A is disposed in a second row, any other photo sensor unit PHU disposed in a most adjacent (i.e., a first or a third row) is not aligned in the column direction (e.g., the DR1 direction) of the photo sensor unit A. In addition, any other photo sensor unit PHU disposed in a most adjacent column to photo sensor unit A is not aligned in the row direction (e.g., the DR2 direction) therewith. For example, when photo sensor unit A is disposed in an interior row and an interior column of a photo sensor unit PHU matrix, no other photo sensor unit PHU disposed in an immediately adjacent row or column overlaps the photo sensor unit A in the column direction (e.g., the DR1 direction) and/or the row direction (e.g., the DR2 direction).

For example, referring to FIG. 8, as for at least one of the photo sensor units PHU, any other photo sensor unit PHU disposed in a most adjacent row is not aligned in the column direction (e.g., the DR1 direction). For example, with respect to a photo sensor unit B disposed in the second row and second column, any other photo sensor unit PHU disposed in a most adjacent first or third row is not aligned in the column direction (e.g., the DR1 direction). However, photo sensor units D and E are disposed in a first column and first and third rows, respectively, are aligned in the column direction (e.g., the DR1 direction) of a photo sensor unit C disposed on the second row and the first column.

Also, referring to FIG. 8, at least one photo sensor unit PHU is not aligned in the row direction (e.g., the DR2 direction) with any other photo sensor unit PHU disposed in a most adjacent column. However, photo sensor units C and F disposed in adjacent first and third columns to photo sensor unit B are aligned in the row direction (e.g., the DR2 direction) with the photo sensor unit B disposed in the second row and the second column. Any other photo sensor unit PHU is not aligned in the row direction (e.g., the DR2 direction) of a photo sensor unit E disposed on the third row and the first column, on a most adjacent column (i.e., the second column) of the corresponding photo sensor unit E.

According to an exemplary embodiment of the present invention, photo sensor units PHU disposed in even rows may be spaced at a smaller distance than photo sensor units PHU disposed in odd rows, and photo sensor units PHU disposed in inner columns may be spaced at a smaller distance to one another than to photo sensor units PHU disposed in outer columns. For example, two outermost columns may straddle a figure eight shape comprised of clustered photo sensor units PHU.

Referring to FIG. 9, with respect to each photo sensor unit PHU, any other photo sensor unit PHU disposed in a most adjacent column is not aligned in the column direction (e.g., the DR1 direction). In addition, with respect to each photo sensor unit any other photo sensor unit PHU disposed in a most adjacent column is not aligned in the row direction the DR2 direction).

For example, any other photo sensor unit PHU is not aligned in the column direction (e.g., the DR1 direction) of a photo sensor unit G disposed on a third row, on most adjacent rows (a first row and the third row) of the corresponding photo sensor unit G. In addition, any other photo sensor unit disposed in a most adjacent column (e.g., the first and third columns) is not aligned in the row direction (e.g., the DR2 direction) of the photo sensor unit G disposed on the third row.

In the exemplary embodiments of the present invention shown in FIGS. 7 and 8, the photo sensor units PHU are arranged in a quadrangular shape. Accordingly, the sensing region SA can be defined in the quadrangular shape.

In the exemplary embodiment of the present invention shown in FIG. 9, the photo sensor units PHU are arranged in a circular shape. Accordingly, the sensing region SA can be defined in the circular shape. This embodiment may correspond closely with the circular shape of the fingerprint of the user and may therefore facilitate accurate detection.

In the above-described exemplary embodiments of the present invention, distances W1 and W2 between adjacent photo sensor units PHU in the row direction (e.g., the DR2 direction) and the column direction (e.g., the DR1 direction) may be, for example, about 5 mm or less. In an exemplary embodiment of the present invention, the distances W1 between photo sensor units PHU aligned in the row direction (e.g., the DR2 direction) may be about 2 mm to about 3 mm. In addition, the distances W2 between photo sensor units PHU aligned in the column direction (e.g., the DR1 direction) may be about 2 mm to about 3 mm. However, the distances between the photo sensor units in accordance with the present invention are not limited to the above-described numerical values.

When the photo sensor units PHU in the sensing region SA are arranged in a pattern where the photo sensor units PHU can be spaced apart from each other as wide as possible within a range required to detect a fingerprint, the size of the sensing region SA may be substantially increased. For example, the photo sensor units PHU are dispersed and arranged in the pattern within the limited total area of the photo sensor units PHU, so that the sensing region SA on the display panel 110 can be substantially expanded.

For example, in the present invention, when a display device integrated with a fingerprint sensor is implemented using a photo sensor PHU having a predetermined size (e.g., an area), such as a CIS package, the CIS package is divided into a plurality of photo sensor units PHU, and the divided photo sensor units PHU are dispersed and arranged on the first surface (e.g., the rear surface) of the display panel 110. Accordingly, in the present invention, it is not required to purchase an additional CIS package for implementing a wider sensing region SA, and the sensing region SA can be more widely expanded while maintaining or increasing the accuracy of fingerprint sensing. Consequently, in the present invention, manufacturing cost of the display device 10 is not increased, and high-resolution and high-accuracy fingerprint detection is possible in a wider region on the display panel 110.

The arrangement of the photo sensor units PHU is not limited to those described above. For example, the photo sensor units PHU may be arranged such that the rows and columns of the embodiments shown in FIGS. 7, 8 and 9 are reversed. In addition, various arrangements may be utilized provided that the total area (e.g., a cumulative planar area) of the photo sensor units PHU in the sensing region SA does not exceed ½ of the area of the sensing region SA. In addition, various arrangements may be utilized in which the photo sensor units PHU having the same total area but different shapes in the sensing region SA are arranged at the above-described distances.

Figure 10:
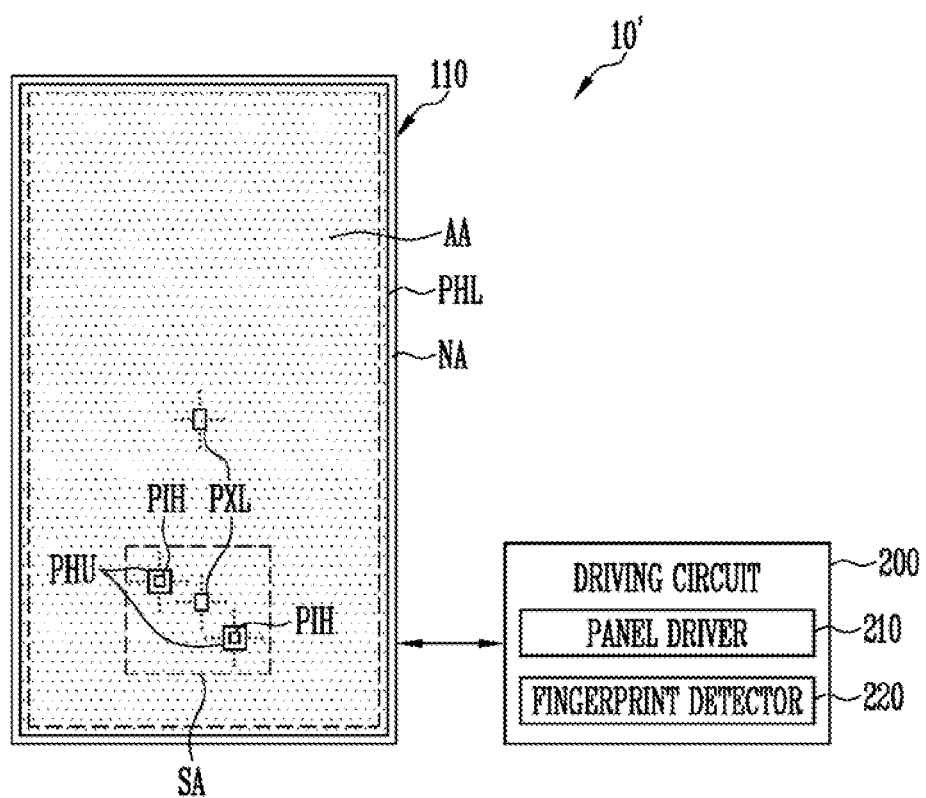
FIGS. 10 and 11 are plan views schematically illustrating a display device in accordance with an exemplary embodiment of the present invention.
Figure 11:
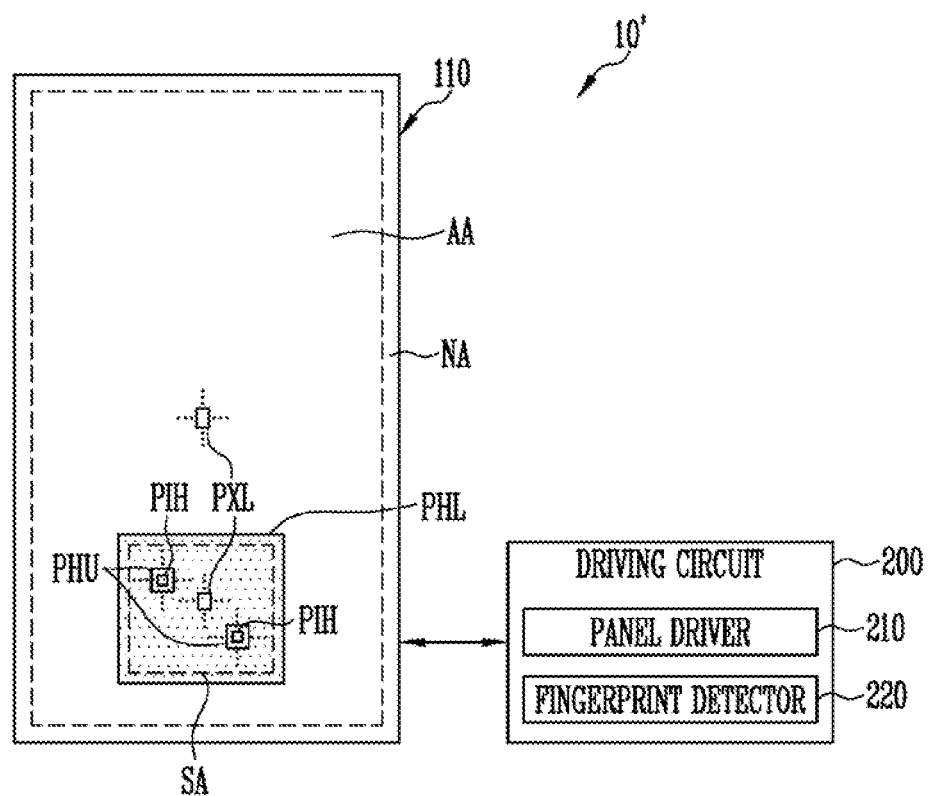

FIGS. 10 and 11 are plan views schematically illustrating a display device in accordance with an exemplary embodiment of the present invention. More specifically, FIGS. 10 and 11 are plan views schematically illustrating a display panel 110 and a driving circuit 200 for driving the display panel 110 provided in the display device 10' in accordance with exemplary embodiments of the present invention. For convenience of illustration, the display panel 110 and the driving circuit 200 are separately illustrated in FIGS. 10 and 11, but the present invention is not limited thereto. For example, the whole or a portion of the driving circuit may be integrally implemented with the display panel 110 or may be disposed on the display panel 110.

Referring to FIGS. 10 and 11, the display device 10' may further include a light blocking layer PHL which may be disposed in the display panel 110 or between the display panel 110 and the photo sensor units PHU, to block some frequencies of light incident to the photo sensor units PHU. For example, the light blocking layer PHL may selectively block or pass light of specific frequencies thereinafter, referred to as reflected light) reflected from an object, e.g., a finger in contact with a second surface (e.g., the front surface) of the display panel 110. Some light incident to the light blocking layer PHL may be blocked, and the other frequencies may pass through the light blocking layer PHL thus reaching the photo sensor units PH U disposed on a first surface (e.g., a rear surface) of the light blocking layer PHL.

The light blocking layer PHL comprises a plurality of pin holes PIH. Each of the pin holes PIH may refer to an optical hole, and may also be referred to as a light-passing hole. For example, the pin hole PIH may be a light-passing hole having the smallest size (e.g., a planar area) among light-passing holes when layers of the display device 10 overlap with each other, on a path along which reflected light passes through the display panel 110 in an oblique direction or vertical direction and then is incident into the sensor pixels SPXL. Various exemplary embodiments of the size, shape, and arrangement of the pin holes PIH will be described in more detail below with reference to FIGS. 12, 13, 14, and 15.

In various exemplary embodiments of the present invention, the pin holes PIH may be formed in the light blocking layer PHL such that at least some of the pin holes PIH overlap with the photo sensor units PHU. For example, the pin holes PIH may be formed throughout the entire light blocking layer PHL, and some of the pin holes PIH may be entirely overlapped by the photo sensor units PHU. The pin holes PIH may overlap with the photo sensor units PHU in the light blocking layer PHL, or may be formed in a region adjacent to the light blocking layer PHL. A detailed arrangement relationship between a plurality of pin holes PIH and photo sensor units PHU in the light blocking layer PHL will be described in more detail later with reference to FIGS. 13, 14, and 15.

In an exemplary embodiment of the present invention, the light blocking layer PHL may correspond to the display region AA. For example, the light blocking layer PHL may have a size larger than that of the display area AA as shown in FIG. 10, so that a portion of the light blocking layer PHL overlaps with the non-display region NA. However, the present invention is not limited thereto. For example, the light blocking layer PHL may have a size equal to or smaller than that of the display region AA.

In an exemplary embodiment of the present invention, the light blocking layer PHL may correspond to the display region AA even when the sensing region SA is only provided as a portion of the display region AA as shown in FIG. 10. However, the scope of the present invention is neat limited thereto. In an exemplary embodiment of the present invention, the light blocking layer PHL may correspond to the sensing region SA as shown in FIG. 11.

The sensing region SA may correspond to the whole of the display region AA without exceeding the boundaries thereof. Therefore, the light blocking layer PHL may correspond to the entire display region AA.

Figure 12:
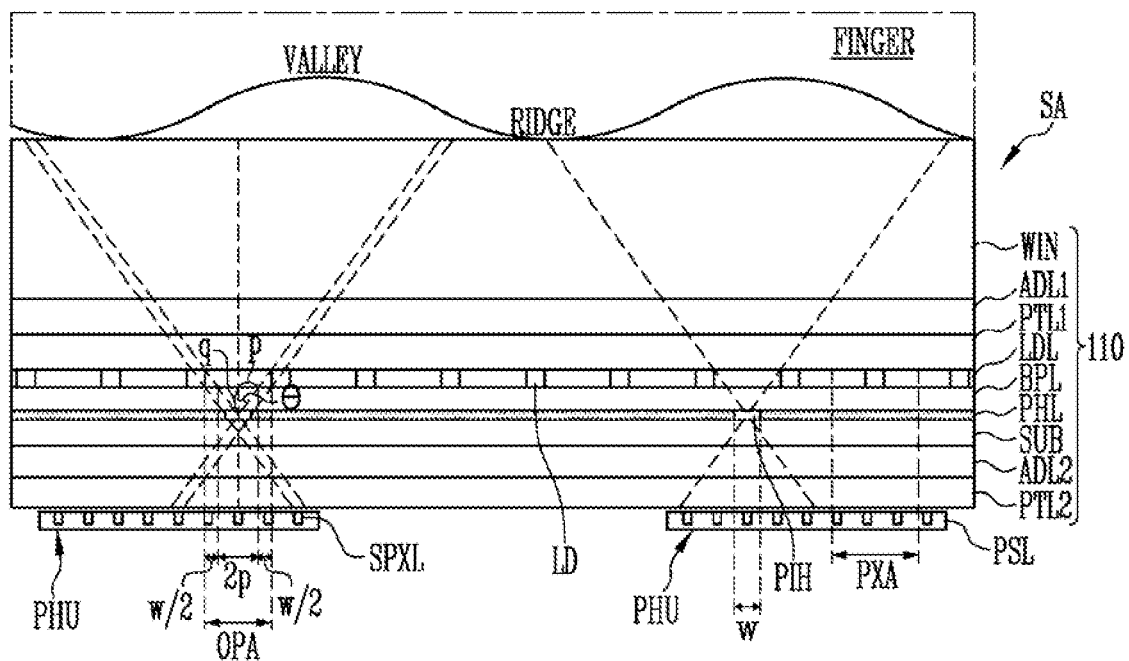
FIG. 12 is a cross-sectional view illustrating a display device according: to an exemplary embodiment of the present invention.

FIG. 12 is a cross-sectional view of the display device 10' shown in FIGS. 10 and 11. Referring to FIG. 12, the display device 10' further comprises a light blocking layer PHL. The light blocking layer PHL may be disposed between the light emitting element layer LDL and the sensor layer PSL. For example, the light blocking layer PHL may be disposed between the substrate SUB and the circuit element layer BPL. The light blocking layer PHL may include a plurality of pin holes PIH. The pin holes PIH may expose the second surface (e.g., the front surface) of the substrate SUB and a first surface (e.g., a rear surface) of the circuit element layer BPL and may be spaced apart at regular intervals. For example, a pinhole PIH may be provided between adjacent light emitting elements LD in a cross-section, and the pinhole PIH may receive reflected light passing through the adjacent light emitting elements LD or a region adjacent thereto. The display panel 110 may be transparently formed in at least a region in which each pin hole PIH is disposed (e.g., the sensing area SA) such that reflected light reflected from, for example, the fingerprint of the finger of the user, passes through the pin hole PIH. However, the present invention is not limited thereto. For example, the entire display panel 110 may be formed of an at least partially transparent material, except for the light blocking layer PHL.

Also, in order to reduce loss of reflected light necessary for fingerprint sensing, the display panel 110 may be configured such that light satisfying an observation view (also referred to herein as a "field of view FOV)") in a predetermined angle range can pass through each pin hole PIH. For example, the pinholes PIH may be disposed such that reflected rays of light intersect at or adjacent to an opening thereof.

For example, the display panel 110 may be transparently formed in a region overlapping the pinhole region PIHA (See FIGS. 13, 14, and 15) containing the pin hole PIH and may have a width OPA wider than a width w of the pin hole PIH. Hereinafter, the region containing the pinhole PIH and transparently formed such that the reflected light can pass therethrough may also be referred to as an "optical opening region." The optical opening region may extend in a thickness direction through various layers of the display panel 110 towards the sensor layer PSL. According to an exemplary embodiment of the present invention, the optical opening regions may be disposed on a two-dimensional array comprising a plurality of rows and a plurality of columns in a regular or irregular pattern. For example, as for at least one of the optical opening regions, any other opening region disposed in a most adjacent row is not aligned in a column direction and/or a row direction.

A first portion of an optical opening region may be defined between the entry points of mirror symmetrical first rays of light (e.g., rays incident to an interface between the light emitting element layer LDL and the circuit element layer BPL) overlapping the pin hole PIH. The first portion may have the width OPA. For example, the portion of the optical opening region with the width OPA may be formed at an interface between the circuit element layer BPL and the light emitting element layer LDL between adjacent light emitting elements LD. A second portion of the optical opening region may have a width p. The second portion of the optical opening region with the width p may be defined between the entry point of each light ray of a pair of symmetrical second light rays and an imaginary center line of the pin hole PIH. The second portions of the optical opening region may collectively have a width $2p$, and the width $2p$ may have a smaller width than the width OPA of the first portion of the optical opening region. The difference between the width OPA and the width $2p$ may be equal to the width of the pinhole PIH w. For example, a difference in distance between the point of entry at the optical opening region of a first ray and a corresponding, parallel second ray may be equal to w/2.

When, with respect to the center of each pin hole PIH, the FOV in a desired range is θ, the thickness of the circuit element layer BPL is q, and the width of the collective second portions of the optical opening region formed at a boundary surface between the circuit element layer BPL and the light emitting element layer LDL is $2p$, $2p=2\times(q\times\tan\theta)$. In an exemplary embodiment of the present invention, the FOV may be an angle in a range of about 30 degrees to about 60 degrees, e.g., 45 degrees, but the present invention is not limited thereto.

The pin holes PIH may have the predetermined width w, e.g., the width w may be in a range of 5 μm to 20 μm. The width of the optical opening region OPA is obtained according to the width w of the pin holes PHI, and may be equal to the formula $2p+w$. The width of an optical opening region OPA, which is to be secured in each layer of the display device 10, may gradually increase as each pin hole PHI becomes more distant from the light blocking layer PHL (i.e., the pin hole PIH approaches in upper and lower directions).

The width w (e.g., a diameter) of the pin holes PIH may be about ten times longer than the wavelength of reflected light, e.g., about 4 μm or 5 μm or more so as to prevent diffraction of light. Also, the width w of the pin holes PIH may be set to a size large enough to prevent image blur and to more clearly sense the shape of a fingerprint. For example, the width w of the pin holes PIH may be set to about 15 μm or less. However, the present invention is not limited thereto, and the width w of the pin holes PIH may vary depending on the wavelength band of reflected light and/or the thickness for each layer.

The distance (e.g., a pitch) between adjacent pin holes PIH may be determined according to the distance between the light blocking layer PHL and the sensor layer PSL and the wavelength range of reflected light. For example, when the FOV of reflected light, which is to be secured, is about 45 degrees, the distance (e.g., the pitch) between adjacent pin holes PIH may be at least twice the distance between the light blocking layer PHL and the sensor layer PSL, and the distance may be no less than a value obtained by adding a predetermined error range to the distance. Thus, images observed by the respective sensor pixels SPXL can be prevented from overlapping with each other, and accordingly, an image blur can be prevented.

Only reflected light passing through the pin holes PIH may reach the photo sensor units PHU. The sensor pixels SPXL of the photo sensor units PHU may output electrical signals, e.g., voltage signals corresponding to the received reflected light.

As described above, the display device 10' in accordance with the present invention has a fingerprint sensor comprising the light emitting element layer LDL, the sensor layer PSL, and the light blocking layer PHL. The light emitting element layer LDL may include the light emitting elements LD capable of serving as a light source of a photosensitive type fingerprint sensor. The sensor layer PSL may include the sensor pixels SPXL for receiving reflected light that is emitted from the light emitting element layer LDL and then reflected off of an object (e.g., the fingerprint region of the finger) located on the second surface (e.g., the front surface) of the display device 10'. The light blocking layer PHL may include the pin holes PHI disposed between the light emitting element layer LDL and the sensor layer PSL to selectively pass reflected light.

Figure 13:
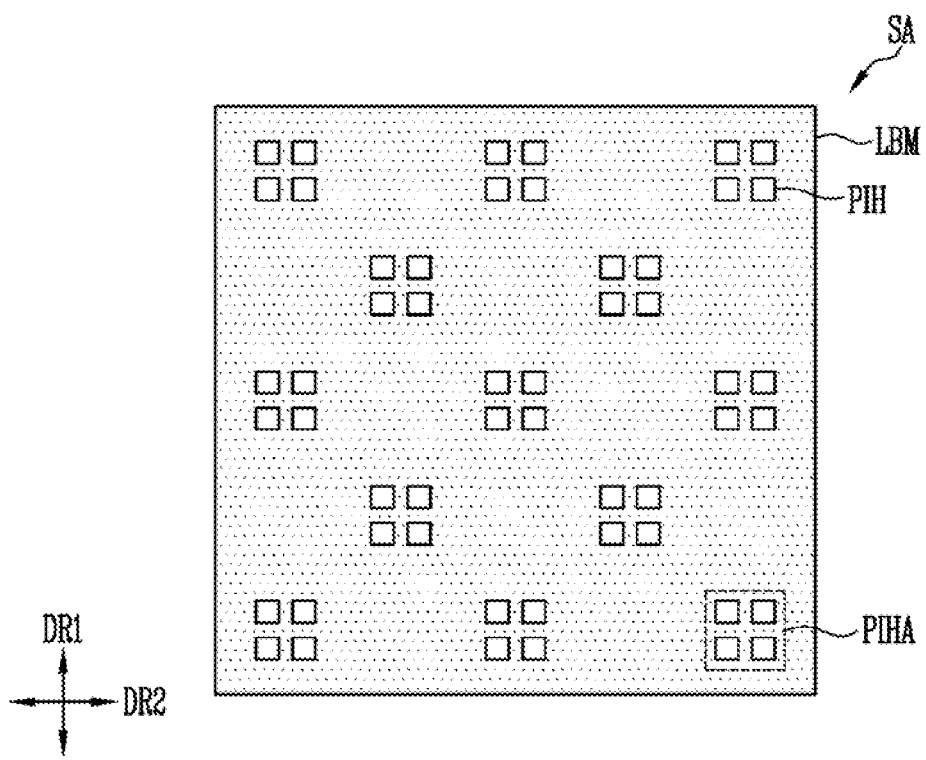
FIGS. 13, 14 and 15 are plan views illustrating a light blocking layer shown in FIG. 12 according to various exemplary embodiments of the present invention.
Figure 14:
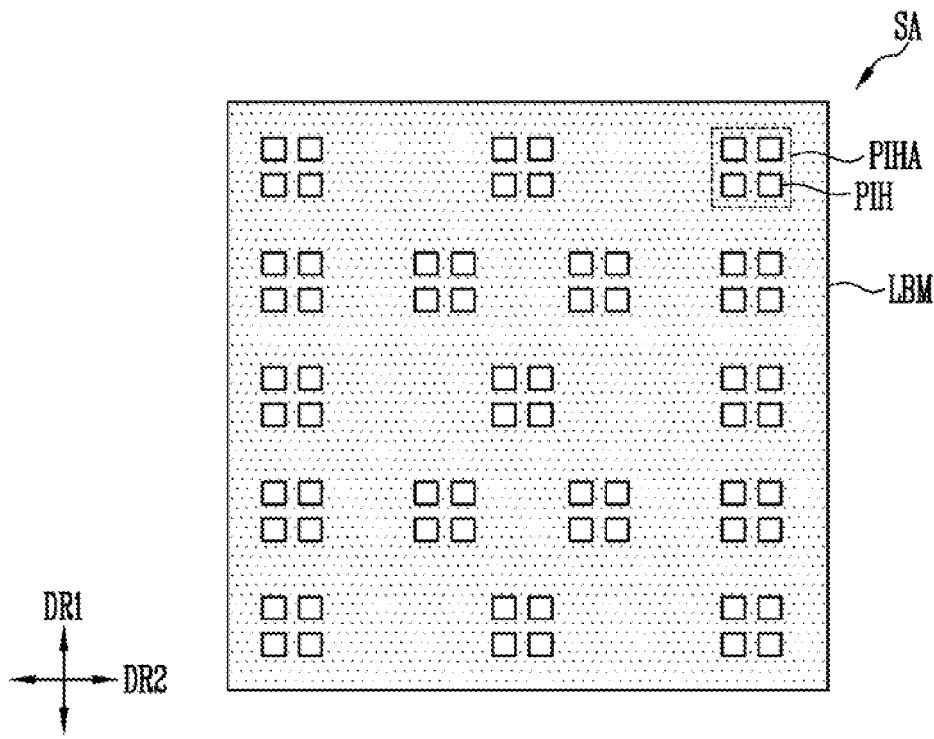
Figure 15:
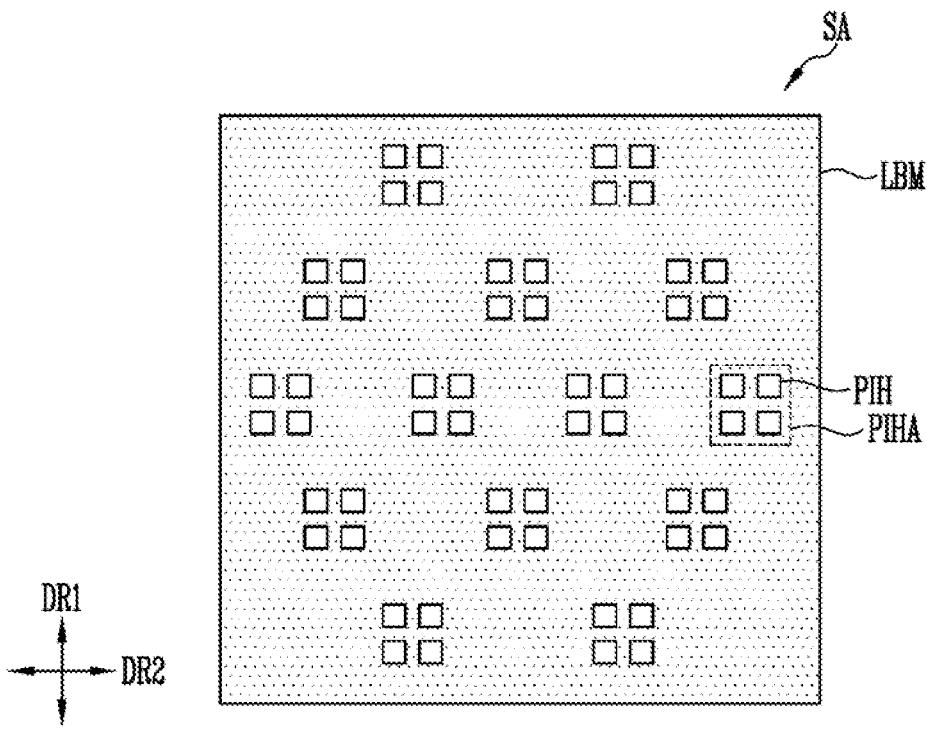

FIGS. 13, 14 and 15 are views illustrating various exemplary embodiments of the light blocking layer shown in FIG. 12.

The light blocking layer PHL may be an optical system for selectively passing only some frequencies of light and blocking the other frequencies of light. The light blocking layer PHL along with the sensor pixels SPXL described above may collectively comprise a fingerprint sensor. Also, the light blocking layer PHL may be integrally formed with the circuit element layer BPL of the display panel 110. Thus, the thickness of the display device having the photosensitive type fingerprint sensor can be reduced.

Referring to FIGS. 13, 14 and 15, the light blocking layer PHL of the present invention may include a light blocking mask LBM and a plurality of pin holes PIH dispersed in the light blocking mask LBM.

The light blocking mask LBM may be made of a light blocking and/or light absorbing material. For example, the light blocking mask LBM may be an opaque metal layer locally opened in regions in which the respective pin holes PIH are disposed. However, the material constituting the light blocking mask LBM is not limited to metal, and the light blocking mask LBM may be made of various materials capable of blocking light passing therethrough. For example, the light blocking mask LBM may include a black matrix material.

The pin holes PIH may be openings dispersed in the light blocking mask LBM. For example, each of the pin holes PIH may be an empty space opened when at least one region of the light blocking, mask LBM is removed, and may be a through hole penetrating the light blocking mask LBM. Alternatively, each of the pin holes PIH may be an optical hole transparently or translucently formed to selectively pass only some frequencies of lights incident thereinto. In either case, the pin holes PIH may also be referred to herein as light-passing holes. For example, the light-passing holes LTH described e.g., with reference to FIG. 16, may be pin holes that are transparently or translucently formed or may comprise an empty space.

The pin holes PIH may be dispersed in a regular pattern or an irregular pattern in the light blocking mask LBM to have a certain size and shape. The pin holes PIH may be formed to have a size and a distance, which may sense the shape of a fingerprint while preventing diffraction of incident light. For example, the width of the pin holes PIH may be about ten times greater than the wavelength of incident light, or more, so as to prevent diffraction of light. In addition, the distance between adjacent pin holes PIH may be determined based on the distance between the light blocking layer PHL and the sensor pixels SPXL, the wavelength of incident light, and the FOV required with respect to the pin holes PIH.

Although a case where the pin holes PIH have a rectangular shape is illustrated in FIGS. 13, 14 and 15, the scope of the present invention is not limited thereto. In exemplary embodiments of the present invention, the pin holes PIH may have various shapes such as a quadrangular shape, a circular shape, an elliptical shape, and a polygonal shape. However, the present invention is not limited thereto, and the size, shape, number, resolution, and/or arrangement structure of the pin holes PIH may be variously modified.

In exemplary embodiments of the present invention, the pin holes PIH may be patterned in a plurality of the pin hole regions PIHA. For example, the pin holes PIH may be formed in the pin hole regions PIHA of the light blocking mask LBM.

The pin hole regions PIHA are arranged on the light blocking mask LBM to be spaced apart from each other, and may be regularly or irregularly arranged on the light blocking mask LBM. For example, the pin hole regions PIHA may be arranged on a two-dimensional array comprising a plurality of rows and a plurality of columns.

As for at least one pin hole region PIHA, any other pin hole region PIHA disposed in a most adjacent row might not be aligned in a column direction (e.g., the DR1 direction). Alternatively or additionally, as for the at least one pin hole region PIHA, any other pin hole region PIHA in a most adjacent column might not be aligned in a row direction (e.g., the DR2 direction).

For example, referring to FIG. 13, with respect to the at least one pin hole region PIHA, any other pin hole region PIHA disposed on a most adjacent row is not aligned in the column direction e.g., the DR1 direction). In addition, with respect to the at least one pin hole region PIHA, any other pin hole region PIHA disposed on a most adjacent column is not aligned in the row direction (e.g., the DR2 direction).

For example, referring to FIG. 14, with respect to at least one pin hole region PIHA, any other pin hole region PIHA disposed in a most adjacent row is not aligned in the column direction (e.g., the DR1 direction). In addition, as for at least one pin hole region PIHA, any other pin hole region PIHA disposed in a most adjacent column is not aligned in the row direction (e.g., the DR2 direction).

For example, referring to FIG. 15, with respect to at least one pin hole region PIHA any other pin hole region PIHA disposed in a most adjacent row is not aligned in the column direction (e.g., the DR1 direction). In addition, any other pin hole region PIHA disposed in a most adjacent column to the at least one pin hole region PIHA is not aligned in the row direction (e.g., the DR2 direction).

The arrangement patterns of the pin hole regions PIHA, which are shown in FIGS. 13, 14 and 15, correspond to those of the photo sensor units PHU, which are shown in FIGS. 7, 8 and 9, respectively. In an exemplary embodiment of the present invention, the pin hole regions PIHA may be disposed to correspond one-to-one to the photo sensor units PHU. In the present invention, when the photo sensor units PHU are patterned in the sensing region SA, the pin hole regions PIHA in the light blocking layer PHL can be arranged in the same pattern.

Although an example in which four pin holes PIH are formed in one pin hole region PIHA is illustrated in FIGS. 13, 14 and 15, the present invention is not limited thereto, and a larger number of pin holes PIH or a smaller number of pin holes PIH may be formed in one pin hole region PIHA. In addition, the same number of pin holes PIH or different numbers of pin holes PIH may be formed in each of the pin hole regions PIHA.

Although an example in which the pin holes PIH are regularly arranged in one pin hole region PIHA is illustrated in FIGS. 13, 14 and 15, the scope of the present invention is not limited thereto. For example, the pin holes PIH may be irregularly dispersed in at least one pin hole region PIHA.

Figure 16:
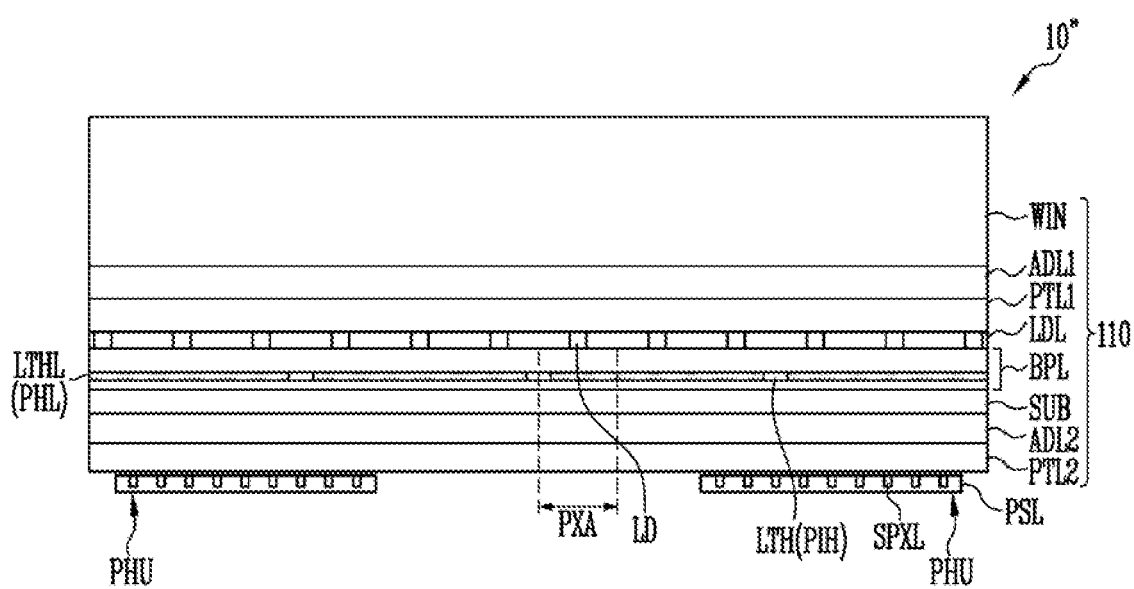
FIG. 16 is a cross-sectional view of a display device in accordance with an exemplary embodiment of the present invention.

FIG. 16 is a cross-sectional view of a display device 10'' in accordance with an exemplary embodiment of the present invention. Referring to FIG. 16, the circuit element layer BPL may include a light-passing, hole array layer LTHL disposed in the sensing region SA. For example, the light-passing hole array layer LTHL may include a plurality of light-passing holes LTH dispersed in the circuit element layer BPL. As mentioned above, the light-passing holes LTH may have the same structure as the pin holes PIH. Therefore, the light-passing hole array layer LTHL may be provided at least partially in substitution and/or in addition to the light blocking layer PHL. For example, the light-passing holes LTH may substitute the pin holes PIH, respectively. In addition, the light-passing hole array layer LTHL may include light-passing regions and/or light-passing holes LTH with substantially similar arrangements to the light blocking layer PHL, the pinhole opening regions PIHA, and the pin holes PIH, respectively. For example, the light-passing regions may correspond one-to-one to the photo sensor units PHU.

The light-passing hole array layer LTHL may be provided in the circuit element layer BPL in addition to the light blocking layer PHL, the light-passing holes LTH may be arranged in the patterns shown in FIGS. 13, 14 and 15, in substitution for or in addition to the pin holes PIH. For example, the light-passing hole array layer LTHL shown in FIG. 16 may be provided to pixels PXL corresponding to the positions of the pin holes PIH shown in FIGS. 13, 14 and 15. In addition, the light-passing hole array layer LTHL might not be provided to pixels PXL that do not correspond to the positions of the pin holes PHL as shown in FIGS. 13, 14 and 15.

When pin holes PIH are configured using the plurality of light-passing holes LTH dispersed in the circuit element layer BPL, without separately providing the light blocking layer PHL as shown in FIG. 16, a separate mask process for forming the light blocking layer PHL can be omitted. Also, in the display device 10'' shown in FIG. 16 in accordance with the exemplary embodiment of the present invention, an increase in thickness, which is caused when the light blocking layer PHL is separately provided, can be prevented. Further, manufacturing cost can be reduced, and process efficiency can be increased.

In addition, when the pin holes PIH are provided in the circuit element layer BPL as shown in FIG. 16, the distances between the pin holes PIH and the optical opening regions described with reference to FIG. 12 are decreased, and hence the width of the optical opening regions can be decreased. Thus, the size of the pixel region PXA can also be decreased, and a high-resolution display device 10'' can be implemented.

Hereinafter, an exemplary embodiment of the present invention in which pin holes PIH, i.e., light passing holes LTH are provided in the circuit element layer BPL in substitution for the light blocking layer PHL, will be described in detail.

Figure 17:
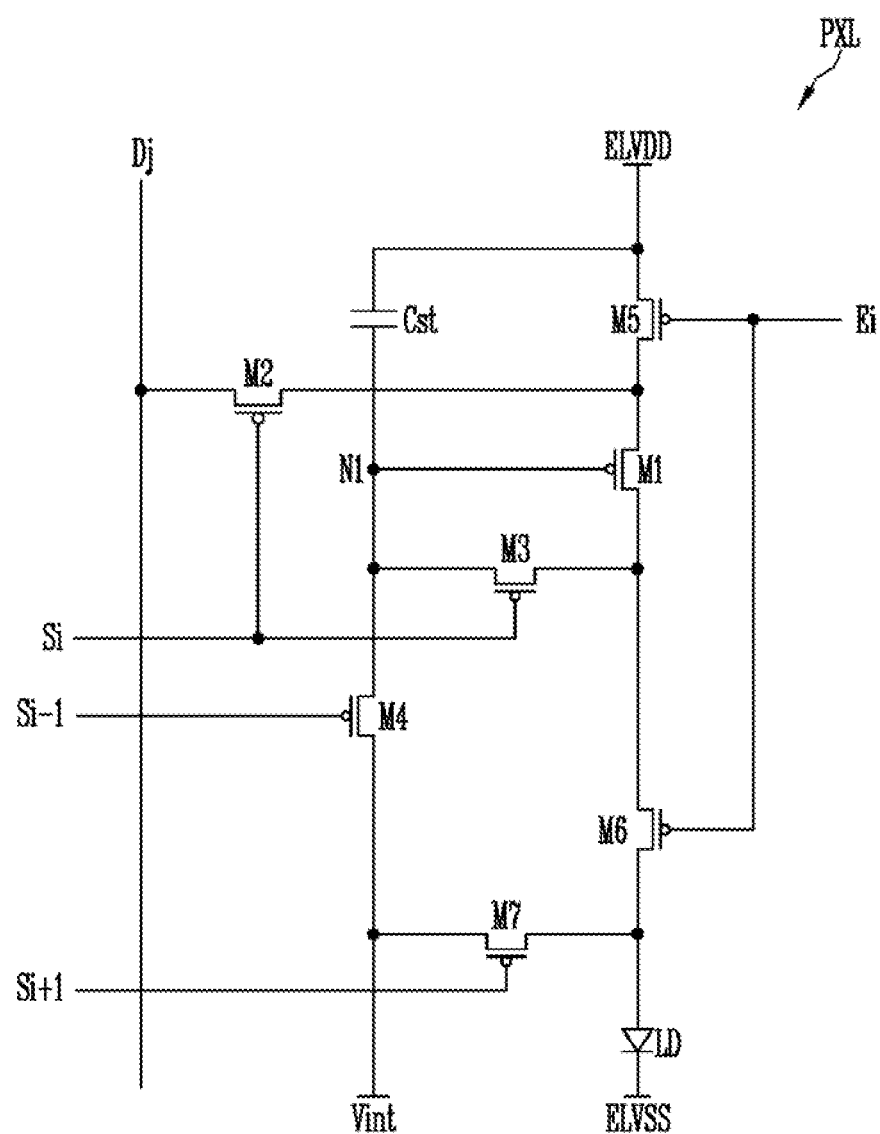
FIG. 17 is a circuit diagram illustrating a pixel in accordance with an exemplary embodiment of the present invention.

FIG. 17 is a cross-sectional view illustrating a pixel in accordance with an exemplary embodiment of the present invention. For convenience of description, an active pixel PXL connected to an ith (i is a positive integer) scan line Si disposed on an ith horizontal pixel column, an ith emission control line Ei, and a jth (j is a positive integer) data line Dj disposed on a jth vertical pixel column, the active pixel PXL comprising seven transistors M1, M2, M3, M4, M5, M6 and M7 is illustrated in FIG. 17. However, the structure of the pixel PXL is not limited to that shown in FIG. 17.

Referring to FIG. 17, the pixel PXL in accordance with the exemplary embodiment of the present invention may include a first transistor M1, a second transistor M2, a third transistor M3, a fourth transistor M4, a fifth transistor M5, a sixth transistor M6, and a seventh transistor M7, a storage capacitor Cst, and a light emitting element LD.

A first electrode of the first transistor (e.g., a driving transistor) M1 may be connected to a first power source ELVDD via the fifth transistor M5, and a second electrode of the first transistor M1 may be connected to an anode electrode of the light emitting element LD via the sixth transistor M6. In addition, a gate electrode of the first transistor M1 may be connected to the first node N1. The first transistor M1 may control an amount of current flowing from the first power source ELVDD to a second power source ELVSS via the light emitting element LD, corresponding to a voltage of the first node N1.

The second transistor (e.g., a switching transistor) M2 may be connected between the jth data line Dj and the first electrode of the first transistor M1. In addition, a gate electrode of the second transistor. M2 may be connected to the ith scan line Si. The second transistor M2 may be turned on when a scan signal is supplied to the ith scan line Si, to electrically connect the jth data line Dj and the first electrode of the first transistor M1.

The third transistor M3 may be connected between the second electrode of the first transistor M1 and the first node N1. In addition, a gate electrode of the third transistor M3 may be connected to the ith scan line Si. The third transistor M3 may be turned on when a scan signal having a gate-on voltage is supplied to the ith scan line Si, to electrically connect the second electrode of the first transistor M1 and the first node N1. Therefore, when the third transistor M3 is turned on, the first transistor M1 may be connected in a diode form.

The fourth transistor (e.g., an initialization transistor) M4 may be connected between the first node N1 and an initialization power source Vint. In addition, a gate electrode of the fourth transistor M4 may be connected to an (i–1)th scan line Si–1. The fourth transistor M4 may be turned on when a scan signal is supplied to the (i–1)th scan line Si–1, to supply a voltage of the initialization power source Vint to the first node N1.

In an exemplary embodiment of the present invention, the (i–1)th scan line Si–1 is used as an initialization control line for initializing a gate node of the first transistor M1, i.e., the first node N1 is illustrated in FIG. 17. However, the scope of the present invention is not limited thereto. For example, in, an exemplary embodiment of the present invention, another control line such as an (i–2)th scan line may be used as the initialization control line for initializing the gate node of the first transistor M1.

The fifth transistor M5 may be connected between the first power source ELVDD and the first transistor M1. In addition, a gate electrode of the fifth transistor M5 may be connected to the ith emission control line Ei. The fifth transistor M5 may be turned off when an emission control signal having a gate-off voltage is supplied to the ith emission control line Ei, and be turned on in other cases.

The sixth transistor M6 may be connected between the first transistor M1 and the light emitting element LD. In addition, a gate electrode of the sixth transistor M6 may be connected to the ith emission control line Ei. The sixth transistor M6 may be turned off when an emission control signal having a gate-off voltage (e.g., a high level voltage) is supplied to the ith emission control line Ei, and be turned on in other cases.

The seventh transistor M7 may be connected between the initialization power source Vint and a first electrode, e.g., the anode electrode of the light emitting element LD. In addition, a gate electrode of the seventh transistor M7 may be connected to an (i+1)th scan line Si+1. The seventh transistor M7 may be turned on when a scan signal having a gate-on voltage (e.g., a low level voltage) is supplied to the (i+1)th scan line Si+1, to supply the voltage of the initialization power source Vint to the anode electrode of the light emitting element. LD. The voltage of the initialization power source may be set as a voltage lower than that of a data signal. For example, the voltage of the initialization power source Vint may be set equal to or lower than an optimum voltage of the data signal.

A case where an anode initialization control line connected to the gate electrode of the seventh transistor M7 is the (i+1)th scan line Si+1 is illustrated in FIG. 17. However, the scope of the present invention is not thereto. For example, in an exemplary embodiment of the present invention, the gate electrode of the seventh transistor M7 may be connected to the ith scan line Si. The voltage of the initialization power source Vint may be supplied to the anode electrode of the light emitting element LD via the seventh transistor M7, when a scan signal having a gate-on voltage is supplied to the ith scan line Si.

The storage capacitor Cst may be connected between the first power source ELVDD and the first node N1. The storage capacitor Cst may store a voltage corresponding to the data signal and a threshold voltage of the first transistor M1.

The anode electrode of the light emitting element LD may be connected to the first transistor M1 via the sixth transistor M6, and a cathode electrode of the light emitting element LD may be connected to the second power source ELVSS. The light emitting element LD generates light with a predetermined luminance corresponding to an amount of current supplied from the first transistor M1. A voltage value of the first power source ELVDD may be set higher than that of the second power source ELVSS.

The structure of the pixel PXL is not limited to the exemplary embodiment of the present invention shown in FIG. 14. Although a case where the transistors M1, M2, M3, M4, M5, M6 and M7 are implemented with a P-type transistor is illustrated in FIG. 17, the scope of the present invention is not limited thereto, and at least one of the transistors M1, M2, M3, M4, M5, M6 and M7 may be replaced with an N-type transistor.

Figure 18:
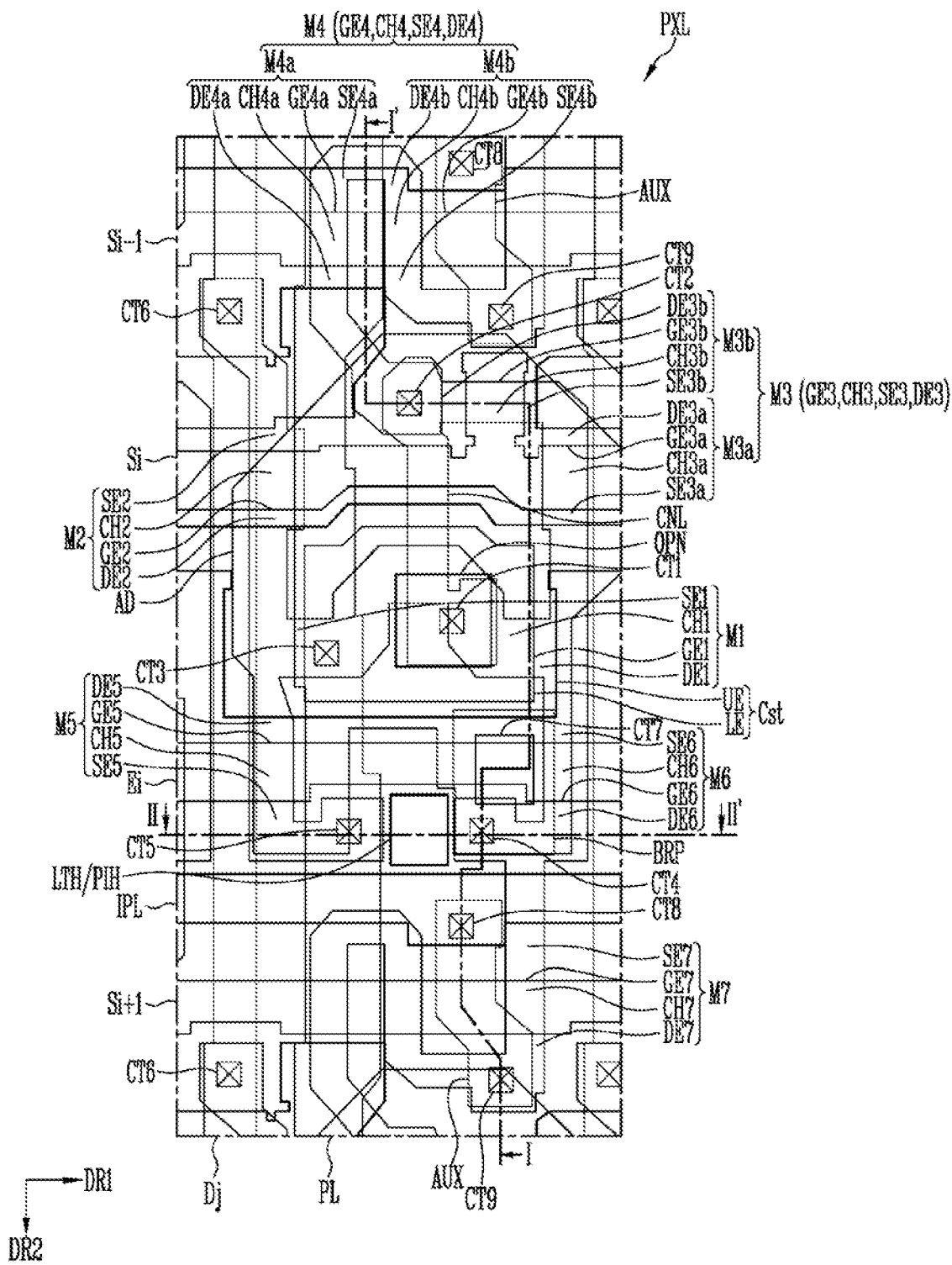
FIG. 18 is a plan view illustrating a layout of the pixel shown in FIG. 17 in accordance with an exemplary embodiment of the present invention.
Figure 19:
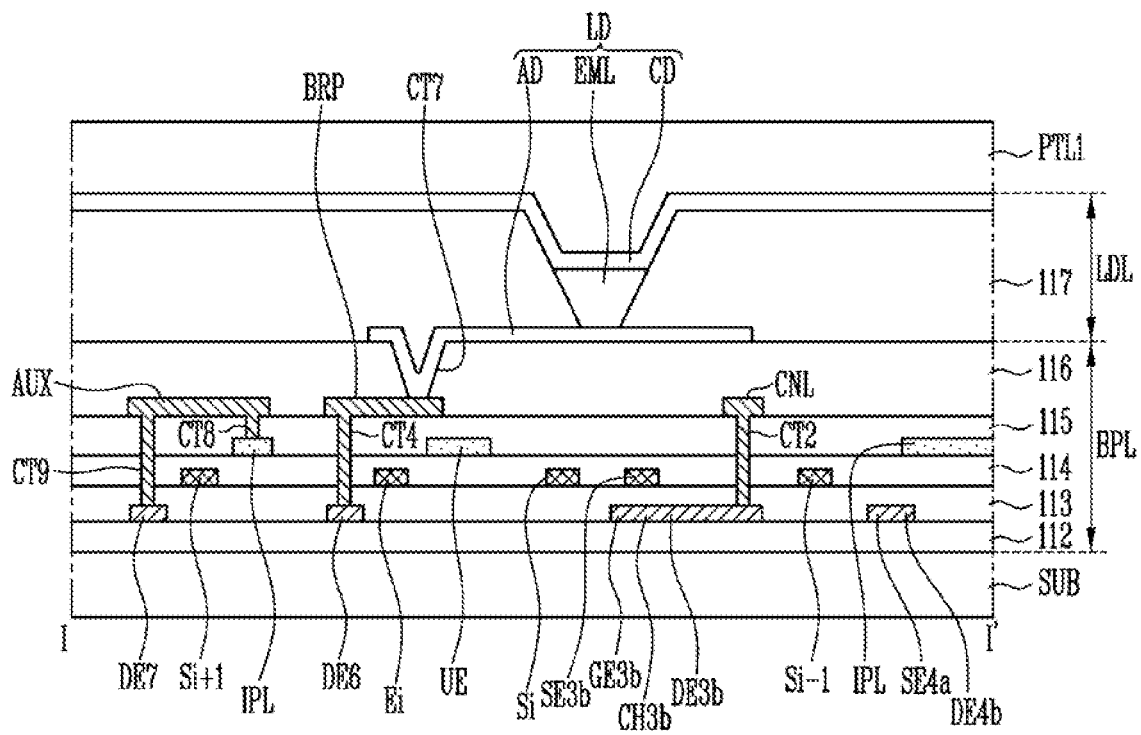
FIG. 19 is a cross-sectional view taken along line shown in FIG. 18.
Figure 20:
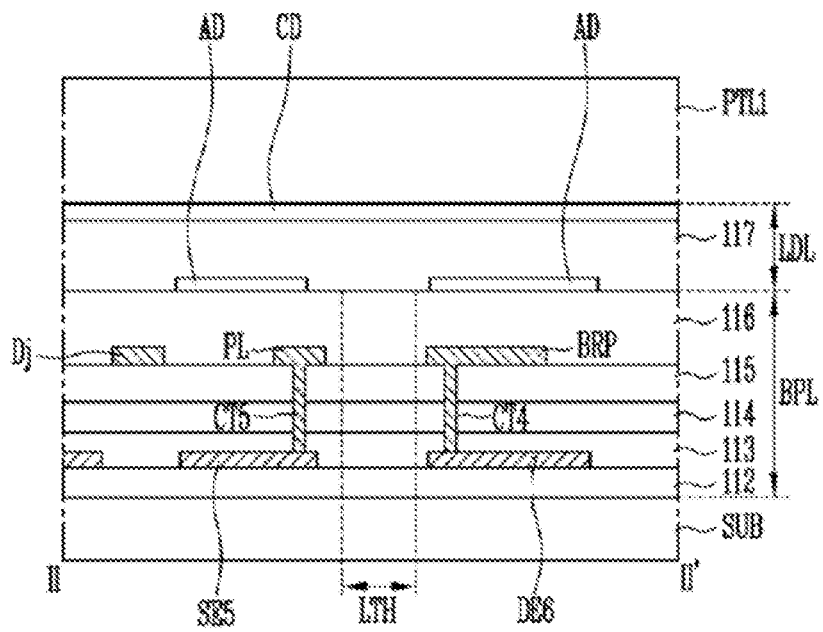
FIG. 20 is a cross-sectional view taken along line II-II' shown in FIG. 18.

FIG. 18 is a plan view illustrating a layout of the pixel shown in FIG. 17 in accordance with an exemplary embodiment of the present invention. FIG. 19 is a sectional view taken along line I-I' shown in FIG. 18. FIG. 20 is a cross-sectional view taken along line II-II' shown in FIG. 18. For example, FIGS. 18 to 20 illustrate a layout of a pixel PXL that overlaps with or is disposed adjacent to a photo sensor unit PHU and comprises a light-passing hole LTH, among pixels PXL arranged in the sensing region SA shown in FIGS. 10 and 11.

In the exemplary embodiment of the present invention shown in FIGS. 18, 19 and 20, for convenience of illustration, a scan line on an (i–1)th row is referred to as an "(i–1)th scan line Si–1," a scan line on an ith row is referred to as an "ith scan line Si," a scan line one an (i+1)th row is referred to as an "(i+1)th scan line Si+1", an emission control line OD the ith row is referred to as an "emission control line Ei," a data line on a jth column is referred to as a "data line Dj," and a power line on the jth column, e.g., a power line on the jth column, to which a first power source ELVDD is applied, is referred to as a "power lure PL."

FIGS. 18, 19 and 20 will be described in conjunction with the above-described exemplary embodiments of the present invention. The display device 10" may include pixels PXL arranged in the sensing region SA and lines for supplying driving signals and/or a power source to the pixels PXL. The lines may include scan lines Si−1, Si, and Si+1, a data line Dj, an emission control line Ei, a power line PL, and an initialization power line IPL.

The scan lines Si−1, Si, and Si+1 may extend in a first direction DR1 in the sensing region SA. The scan lines Si−1, Si, and Si+1 may include an (i−1)th scan line Si−1, an ith scan line Si, and an (i+1)th scan line Si+1, which are sequentially arranged along a second direction DR2 intersecting the first direction (e.g., the DR1 direction). Each of the scan lines Si−1, Si, and Si+1 may be supplied with a scan signal. For example, the (i−1)th scan line Si−1 may be supplied with an (i−1)th scan signal, the ith scan line Si may be supplied with an ith scan signal, and the (i+1)th scan line Si+1 may be supplied with an (i+1)th scan signal.

The emission control line Ei may extend in the first direction (e.g., the DR1 direction) in the sensing region SA to be parallel to the scan lines Si−1, Si, and Si−1. The emission control line Ei may be supplied with an emission control signal.

The data line Dj may extend in the second direction (e.g., the DR2 direction) in the sensing region SA. For example, the data line Dj may extend in a direction intersecting control lines Si−1. Si, Si+1, and Ei comprising the scan lines Si−1, Si, and Si+1 and the emission control line Ei. The data line Dj, may be supplied with a data signal.

The power line PL may extend along the second direction DR2 in the sensing region SA, hut the present invention is not limited thereto. The power line PL may be spaced apart from the data line Dj, and may be supplied with the first power source ELVDD.

The initialization power line IPL may extend along the first direction (e.g., the DR1 direction) in the sensing region SA, but the present invention is not limited thereto. The initialization power line IPL may be supplied with an initialization power source Vint.

In an exemplary embodiment of the present invention, the pixel PXL may include first to seventh transistors M1, M2, M3, M4, M5, M6 and M7, a storage capacitor Cst, and a light emitting element LD as shown in FIG. 17.

The first transistor M1 may include a first gate electrode GE1, a first source electrode SE1, and a first drain electrode DE1.

In an exemplary embodiment of the present invention, the first gate electrode GE1 may be disposed to overlap with a first channel CH1 of an active pattern with at least one insulation layer, e.g., a gate insulation layer 113, interposed therebetween. The first gate electrode GE1 may be connected to a third drain electrode DE3 (comprising DE3a and DE3b) of the third transistor M3 and a fourth source electrode SE4 (comprising SE4a and SE4b) of the fourth transistor M4.

The first gate electrode GE1 may be connected to the third drain electrode DE3 and the fourth source electrode SE4 by a connection line CNL. One end of the connection line CNL may be connected to the first gate electrode GE1 through a first contact hole CT1, and the other end of the connection line CNL may be connected to the third drain electrode DE3 and the fourth source electrode SE4 through a second contact hole CT2.

In an exemplary embodiment of the present invention, the first channel CH1, the first source electrode SE1, and the first drain electrode DE1 may be formed with a semiconductor pattern undoped or doped with an impurity. For example, the first source electrode SE1 and the first drain electrode DE1 may be formed with a semiconductor pattern doped with the impurity, and the first channel CH1 may be formed with a semiconductor pattern undoped with the impurity.

The first channel CH1 may have a shape extending in an arbitrary direction, and may have a shape bent a plural number of times along the extending direction. The first channel CH1 may overlap with the first gate electrode GE1 when viewed on a plane. The first channel CH1 is formed long, so that a channel region of the first transistor M1 can be formed long. Accordingly, the driving range of a gate voltage applied to the first transistor M1 is widened. Thus, the grayscale of light emitted from the light emitting element LD can be finely controlled.

The first source electrode SE1 may be connected to one end of the first channel CH1. The first source electrode SE1 may be connected to a second drain electrode DE2 of the second transistor M2 and a fifth drain electrode DE5 of the fifth transistor M5. In an exemplary embodiment of the present invention, the first drain electrode DE1 may be connected to the other end of the first channel CH1. The first drain electrode DE1 may be connected to a third source electrode SE3 of the third transistor M3 and a sixth source electrode SE6 of the sixth transistor M6.

The second transistor M2 may include a second gate electrode GE2, a second channel CH2, a second source electrode SE2, and the second drain electrode DE2.

The second gate electrode GE2 may be disposed to overlap with the second channel CH2 with at least one insulation layer, e.g., the gate insulation layer 113 interposed therebetween. The second gate electrode GE2 may be connected to the ith scan line Si.

The second channel CH2, the second source electrode SE2, and the second drain electrode DE2 may be formed with a semiconductor pattern undoped or doped with an impurity. For example, the second source electrode SE2 and the second drain electrode DE2 may be formed with a semiconductor pattern doped with the impurity, and the second channel CH2 may be formed with a semiconductor pattern undoped with the impurity. The second channel CH2 may correspond to a portion overlapping with the second gate electrode GE2.

One end of the second source electrode SE2 may be connected to the second channel CH2, and the other end of the second source electrode SE2 may be connected to the data line Dj through a sixth contact hole CT6. In an exemplary embodiment of the present invention, one end of the second drain electrode DE2 may be connected to the second channel CH2, and the other end of the second drain electrode DE2 may be connected to the first source electrode SE1 of the first transistor M1 and the fifth drain electrode DE5 of the fifth transistor M5.

The third transistor M3 may be provided in a double gate structure so as to prevent a leakage current. For example, the third transistor M3 may include a 3ath transistor M3a and a 3bth transistor M3b. The 3ath transistor M3a may include a 3ath gate electrode GE3a, a 3ath channel CH3a, a 3ath source electrode SE3a, and a 3ath drain electrode DE3a. The 3bth transistor M3b may include a 3bth gate electrode GE3b, a3bth channel CH3b, a 3bth source electrode SE3b, and a 3bth drain electrode DE3b. Hereinafter, the 3ath gate electrode GE3a and the 3bth gate electrode GE3b may be referred to as, a third gate electrode GE3, the 3ath channel CH3a and the 3bth channel CH3b may be referred to as a third channel CH3, the 3ath source electrode SE3a and the 3bth source electrode SE3b may be referred to as the third source electrode SE3, and the 3ath drain electrode DE3a and the 3bth drain electrode DE3b may be referred to as the third drain electrode DE3.

The third gate electrode GE3 may be disposed to overlap with the third channel CH3 with at least one insulation layer, e.g., the gate insulation layer 113 interposed therebetween. The third gate electrode GE3 may be connected to the ith scan line Si.

The third channel CH3, the third source electrode SE3, and the third drain electrode DE3 may be formed with a semiconductor pattern undoped or doped with an impurity. For example, the third source electrode SE3 and the third drain electrode DE3 may be formed with a semiconductor pattern doped with the impurity, and the third channel CH3 may be formed with a semiconductor pattern undoped with the impurity. The third channel CH3 may correspond to a portion overlapping with the third gate electrode GE3.

One end of the third source electrode SE3 may be connected to the third channel CH3, and the other end of the third source electrode SE3 may be connected to the first drain electrode DE1 of the first transistor M1 and the sixth source electrode SE6 of the sixth transistor M6. In an exemplary embodiment of the present invention, one end of the third drain electrode DE3 may be connected to the third channel CH3, and the other electrode of the third drain electrode DE3 may be connected to the fourth source electrode SE4 of the fourth transistor M4. In addition, the third drain electrode DE3 may be connected to the first gate electrode GE1 of the first transistor M1 through the second contact hole CT2 and the first contact hole CT1.

The fourth transistor M4 may be provided in a double gate structure so as to prevent a leakage current. For example, the fourth transistor M4 may include a 4ath transistor M4a and a 4bth transistor M4b. The 4ath transistor M4a may include a 4ath gate electrode GE4a, a 4ath channel CH4a, a 4ath source electrode SE4a, and a 4ath drain electrode DE4a, and the 4bth transistor M4b may include a 4bth gate electrode GE4b, a 4hth channel CH4b, a 4bth source electrode SE4b, and a 4bth drain electrode DE4b. Hereinafter, the 4ath gate electrode GE4a and the 4bth gate electrode GE4b may be referred to as a fourth gate electrode GE4, the 4ath channel CH4a and the 4bth channel CH4b may be referred to as a fourth channel CH4, the 4ath source electrode SE4a and the 4bth source electrode SE4b may be referred to as the fourth source electrode SE4, and the 4ath drain electrode DE4a and the 4bth drain electrode DE4b may be referred to as a fourth drain electrode DE4.

The fourth gate electrode GE4 may be disposed to overlap with the fourth channel CH4 with at least one insulation layer, e.g., the gate insulation layer 113 interposed therebetween. The fourth gate electrode GE4 may be connected to the (i−1)th scan line Si−1.

The fourth channel CH4, the fourth source electrode SE4, and the fourth drain electrode DE4 may be formed with a semiconductor pattern undoped or doped with an impurity. For example, the fourth source electrode SE4 and the fourth drain electrode DE4 may be formed with a semiconductor pattern doped with the impurity, and the fourth channel CH4 may be formed with a semiconductor pattern undoped with the impurity. The fourth channel CH4 may correspond to a portion overlapping with the fourth gate electrode GE4.

One end of the fourth source electrode SE4 may be connected to the fourth channel CH4, and the other end of the fourth source electrode SE4 may be connected to the third drain electrode DE3 of the third transistor M3. In addition, the fourth source electrode SE4 may be connected to the first gate electrode GE1 of the first transistor M1 through the connection line CNL, the second contact hole CT2, and the first contact hole CT1. One end of the fourth drain electrode DE4 may be connected to the fourth channel CH4, and the other end of the fourth drain electrode DE4 may be connected to a seventh drain electrode DE7 of a seventh transistor M7 of a pixel PXL on the (i−1)th row. The fourth drain electrode DE4 may be connected to the initialization power line IPL through an auxiliary connection line AUX, a ninth contact hole CT9, and an eighth contact hole CT8.

The fifth transistor M5 may include a fifth gate electrode GE5, a fifth channel CH5, a fifth source electrode SE5, and the fifth drain electrode DE5.

The fifth gate electrode GE5 may be disposed to overlap with the fifth channel CH5 with at least one insulation layer, e.g., the gate insulation layer 113 interposed therebetween. The fifth gate electrode GE5 may be connected to the emission control line Ei.

The fifth channel CH5, the fifth source electrode SE5, and the fifth drain electrode DE5 may be formed with a semiconductor pattern undoped or doped with art impurity. For example, the fifth source electrode SE5 and the fifth drain electrode DE5 may be formed with a semiconductor pattern doped with the impurity, and the fifth channel CH5 may be formed with a semiconductor pattern undoped with the impurity. The fifth channel CH5 may correspond to a portion overlapping with the fifth gate electrode GE5.

One end of the fifth source electrode SE5 may be connected to the fifth channel CH5, and the other end of the fifth source electrode SE5 may be connected to the power line PL through a fifth contact hole CT5. In an exemplary embodiment of the present invention, one end of the fifth drain electrode DE5 may be connected to the fifth channel CH5, and the other end of the fifth drain electrode DE5 may be connected to the first source electrode SE1 of the first transistor M1 and the second drain electrode DE2 of the second transistor M2.

The sixth transistor M6 may include a sixth gate electrode GE6, a sixth channel CH6, the sixth source electrode SE6, and a sixth drain electrode DE6.

The sixth gate electrode GE6 may be disposed to overlap with the sixth channel CH6 with at least one insulation layer, e.g., the gate insulation layer 113 interposed therebetween. The sixth gate electrode GE6 may be connected to the emission control line Ei.

The sixth channel CH6, the sixth source electrode SE6, and the sixth drain electrode DE6 may be formed with a semiconductor pattern undoped or doped with an impurity. For example, the sixth source electrode SE6 and the sixth drain electrode DE6 may be formed with a semiconductor pattern doped with the impurity, and the sixth channel CH6 may be formed with a semiconductor pattern undoped with the impurity. The sixth channel CH6 may correspond to a portion overlapping with the sixth gate electrode GE 6.

One end of the sixth source electrode SE6 may be connected to the sixth channel CH6, and the other end of the sixth source electrode SE6 may be connected to the first drain electrode DE1 of the first transistor M1 and the third source electrode SE3 of the third transistor M3. In an exemplary embodiment of the present invention, one end of the sixth drain electrode DE6 may be connected to the sixth channel CH6, and the other end of the sixth drain electrode DE6 may be connected to a seventh source electrode SE7 of the seventh transistor M7.

The seventh transistor M7 may include a seventh gate electrode GE7, a seventh channel CH7, the seventh source electrode SE7, and a seventh drain electrode DE7.

The seventh gate electrode GE7 may be disposed to overlap with the seventh channel CH7 with at least one insulation layer, e.g., the gate insulation layer 113 interposed therebetween. The seventh gate electrode GE7 may be connected to the (i+1)th scan line Si+1.

The seventh channel CH7, the seventh source electrode SE7, and the seventh drain electrode DE7 may be formed with a semiconductor pattern undoped or doped with an impurity. For example, the seventh source electrode SE7 and the seventh drain electrode DE7 may be formed with a semiconductor pattern doped with the impurity, and the seventh channel CH7 may be formed with a semiconductor pattern undoped with the impurity. The seventh channel CH7 may correspond to a portion overlapping with the seventh gate electrode GE7.

One end of the seventh source electrode SE7 may be connected to the seventh channel CH7, and the other end of the seventh source electrode SE7 may be connected to the sixth chain electrode DE6 of the sixth transistor M6. In an exemplary embodiment of the present invention, one end of the seventh drain electrode DE7 may be connected to the seventh channel CH7, and the other end of the seventh drain electrode DE7 may be connected to the initialization power line IPL through the auxiliary connection line AUX, the ninth contact hole CT9, and the eighth contact hole CT8.

The storage capacitor Cst may include a first capacitor electrode LE and a second capacitor electrode UE. In an exemplary embodiment of the present invention, the first capacitor electrode LE may be a lower electrode of the storage capacitor Cst, and be integrally formed with the first gate electrode GE1 of the first transistor M1. In an exemplary embodiment of the present invention, the second capacitor electrode UE may be an upper electrode of the storage capacitor Cst, and may overlap with the first gate electrode GE1. In addition, when viewed in a plan view, the second capacitor electrode UE may at least partially cover the first capacitor electrode LE. The overlapping area of the first capacitor electrode LE and the second capacitor electrode UE may be widened, so that the capacitance of the storage capacitor Cst can be increased.

The second capacitor electrode UE may extend in the first direction (e.g., the DR1 direction). In an exemplary embodiment of the present invention, a voltage having a level equal to that of the first power source ELVDD may be applied to the second capacitor electrode UE. The second capacitor electrode UE may have an opening OPN in a region in which the first contact hole CT1 through which the first gate electrode GE1 and the connection line CML are in contact with each other is formed.

The light emitting element LD may include a first electrode (e.g., an anode electrode) AD, a second electrode (e.g., a cathode electrode) CD, and an emitting layer EML provided between the first electrode AD and the second electrode CD. In an exemplary embodiment of the present invention, the first electrode AD and the second electrode CD may be disposed in a light emitting region of a light emitting element layer LDL to overlap with each other, and the emitting layer EML may be disposed in the light emitting region. For example, the light emitting region of each pixel PXL may be a region in which the first electrode AD, the emitting layer EML, and the second electrode CD of the light emitting element LD are disposed to overlap with each other.

The first electrode AD may be provided in a predetermined light emitting region. The first electrode AD may be connected to the seventh source electrode SE7 of the seventh transistor M7 and the sixth drain electrode DE6 of the sixth transistor M6 through a fourth contact hole CT4 and a seventh contact hole CT7. A bridge pattern BRP may be provided between the fourth contact hole CT4 and the seventh contact hole CT7. The bridge pattern BRP may connect the sixth drain electrode DE6 and the seventh source electrode SE7 to the first electrode AD.

Hereinafter, a stacked structure (e.g., a sectional structure) of the pixel PXL and the sensing region comprising the same in accordance with an exemplary embodiment of the present invention will be described.

First, a buffer layer 112 may be provided on a first surface (e.g., the rear surface) of a substrate SUB. The buffer layer 112 may prevent a phenomenon in which metal atoms and/or impurities are diffused (e.g., out-gassed) from the substrate SUB. Also, the buffer layer 112 may function to increase the surface flatness of the substrate SUB, when the surface of the substrate SUB is not uniform. The buffer layer 112 may include an inorganic material such as an oxide nitride, an organic material, and/or an organic/inorganic complex material, and may be provided in a single- or multi-layered structure. For example, the buffer layer 112 may have, a triple or more-layered structure comprising silicon oxide, silicon nitride, and/or silicon oxide.

Active patterns may be provided on the buffer layer 112. The active patterns may include the first to seventh channel CH1, CH2, CH3 CH4, CH5, CH6 and CH7. The first to seventh channels CH1, CH2, CH3, CH4, CH5, CH6 and CH7 may be formed of a semiconductor material.

The gate insulation layer 113 may be provided on the buffer layer 112 on which the first to seventh channels CH1, CH2, CH3, CH4, CH5, CH6 and CH7 are provided. In an exemplary embodiment of the present invention, the gate insulation layer 113 may be a gate insulation film interposed between the active patterns and the gate electrodes GE1, GE2, GE3, GE4, GE5, GE6 and GE7 of the transistors M1, M2, M3, M4, M5, M6 and M7 provided in the pixel PXL.

The gate insulation layer 113 may include one or more inorganic layers and/or one or more organic layers. In an example, the gate insulation layer 113 may be configured as an inorganic layer comprising SiOx and/or SiNx but the present invention is not limited thereto. For example, the gate insulation layer 113 may include an organic insulation material and/or an inorganic insulation material, such as SiOx, SiNx, SiON, SiOF and/or AlOx, and may be a single layer or multi-layer.

In an exemplary embodiment of the present invention, the gate insulation layer 113 may have a limited thickness in a predetermined range so as to easily drive the transistors M1, M2, M3, M4, M5, M6 and M7. For example, the gate insulation layer 113 may have a thickness of 1000 Å to 1500 Å e.g., a thickness of about 1200 Å, but the thickness of the gate insulation layer 113 is not limited thereto.

A first conductive layer may be disposed on the gate insulation layer 113. In an exemplary embodiment of the present invention, the first conductive layer may be a first gate layer. The first gate layer may comprise a gate electrode disposed such that at least a portion of the gate electrode overlaps with the active pattern. The control lines Si−1, Si, Si+1, and Ei and the gate electrodes GE1, GE2, GE3, GE4, GE5, GE6 and GE7 may be provided in the first conductive layer. In addition, one electrode, e.g., the first capacitor electrode LE of the storage capacitor Cst may be provided in the first conductive layer. Specifically, the (i−1)th scan line Si−1, the ith scan line Si, the (i+1)th scan, line Si+1, the emission control line Ei, and the first to seventh gate electrodes GE1, GE2, GE3, GE4, GE5, GE6 and GE7 may be provided in the first conductive layer on the second surface (e.g., a front surface) of the gate insulation layer 113. In an exemplary embodiment of the present invention, the first gate electrode GE1 may also become the first capacitor electrode LE of the storage capacitor Cst. For example, the first gate electrode GE1 and the first capacitor electrode LE may be integrally formed.

The control lines Si−1, Si, Si+1, and Ei, the gate electrodes GE1 to GE7, and/or the first capacitor electrode LE as a lower electrode of the storage capacitor Cst, which are disposed in the first conductive layer, may be made of the same material. For example, the control lines Si−1, Si, Si+1, and Ei, the gate electrodes GE1, GE2, GE3, GE4, GE5, GE46 and GE7, and/or the first capacitor electrode LE of the storage capacitor Cst may be formed of a predetermined first gate metal.

Examples of the material comprising the first gate metal may be Ti, Cu, Mo, Al, Au, Cr, TiN, Ag, Pt, Pd, Ni, Sn, Co, Rh, Ir, Fe, Ru, Os, Mn, W, Nb, Ta, Bi, Sb, Pb, etc., and various other metals may be used in addition to these metals. Examples of the alloy constituting the first gate metal may be MoTi, AlNiLa, etc., and various alloys may be used in addition to these alloys. Examples of the multi-layer comprising the first gate metal may be Ti/Cu, Ti/Au, Mo/Al/Mo, Indium Tin Oxide (ITO)/Ag/ITO, TiN/Ti/Al/Ti, Tin/Ti/Cu/Ti, etc., and various conductive materials having multi-layered structures may be used in addition to these multi-layers.

The material comprising the control lines Si−1, Si, Si+1, and Ei, the gate electrodes GE1 to GE7, and/or the first capacitor electrode LE, which are disposed in the first conductive layer, is not necessarily limited to metal. For example, any material capable of providing conductivity high enough to smoothly drive the pixels PXL may be used as the material constituting the control lines Si−1, Si, Si+1, and Ei, the gate electrodes GE1, GE2, GE3, GE4, GE5, GE6 and GE7, and/or the first capacitor electrode LE.

For example, the control lines Si−1, Si, Si+1, and Ei, the gate electrodes GE1, GE2, GE3, GE4, GE5, GE6 and GE7, and/or the first capacitor electrode LE may be made of a conductive polymer and/or conductive metal oxide, Examples of the conductive polymer constituting the control lines Si−1, Si, Si+1, and the gate electrodes GE1, GE2, GE3, GE4, GE5, GE6 and GE7, and/or the first capacitor electrode LE may be a polythiophene-haled compound, a polypyrrole-based compound, a polyaniline-based compound, a polyacetylene-based compound, a polyphenylene-based compound, and/or mixtures thereof. For example, a poly(3,4-ethylenedioxythiophene) polystyrene sulfonate (PEDOT:PSS) compound may be used as the polythiophene-based compound, Examples of the conductive metal oxide comprising the control lines Si−1, Si, Si+1, and Ei, the gate electrodes GE1, GE2, GE3, GE4, GE5, GE6 and GE7, and/or the first capacitor electrode LE may be ITO, Indium Zinc Oxide (IZO), Aluminum Zinc Oxide AZO, ITZO (Indium Tin Zinc Oxide), ZnO and/or SnO2.

A first interlayer insulation layer 114 may be provided on the first conductive layer. In an exemplary embodiment of the present invention, the first interlayer insulation layer 114 may be a first interlayer insulation film interposed between the first capacitor electrode LE and the second capacitor electrode UE of the storage capacitor Cst. In an exemplary embodiment of the present invention, the first interlayer insulation layer 114 may have a limited thickness in a predetermined range so as to secure a sufficient capacitance of the storage capacitor Cst in a limited area. In an exemplary embodiment of the present invention, the first interlayer insulation layer 114 may have a thickness similar to that of the gate insulation layer 113. For example, the first interlayer insulation layer 114 may have a thickness of 1000 Å to 1500 Å, e.g., a thickness of about 1400 Å, but the thickness of the first interlayer insulation layer 114 is not limited thereto.

The first interlayer insulation layer 114 may include one or more inorganic layers and/or one or more organic layers. In an example, the first interlayer insulation layer 114 may include an inorganic layer comprising SiOx and/or SiNx, but the present invention is not limited thereto. For example, the first interlayer insulation layer 114 may include an organic insulation material and/or an inorganic insulation material, such as SiOx, SiNx, SiON, SiOF or AlOx, and may be a single layer or multi-layer.

A second conductive layer may be disposed on the first interlayer insulation layer 114. In an exemplary embodiment of the present invention, the second conductive layer may be a second gate layer. The second gate layer may comprise at least one capacitor electrode.

For example, the second capacitor electrode UE and the initialization power line IPL may be provided in the second conductive layer.

In an exemplary embodiment of the present invention, the second capacitor electrode UE may at least partially cover the first capacitor electrode LE. The second capacitor electrode UE may overlap with the first capacitor electrode LE with the first interlayer insulation layer 114 interposed therebetween, so that the second capacitor electrode UE and the first capacitor electrode LE constitute the storage capacitor Cst.

The initialization power line IPL may extend along the first direction (e.g., the DR1 direction) in the display region AA, but the present invention is not limited thereto. The initialization power line IPL may be supplied with the initialization power source Vint.

The second capacitor electrode UF and the in power source IPL, which are disposed in the second conductive layer, may be made of the same material. For example, the second capacitor electrode UE and the initialization power source IPL may be formed of a predetermined second gate metal. In an exemplary embodiment of the present invention, the second gate metal may be one of the metal materials provided as examples of the first gate metal, but the present invention is not limited thereto. In addition, the material comprising the second capacitor electrode UE and the initialization power source IPL, which are disposed in the second conductive layer, is not necessarily limited to metal. For example, any material capable of providing conductivity high enough to drive the pixels PXL may be used as the material constituting the second capacitor electrode UE and the initialization power source. For example, the second capacitor electrode UE and the initialization power source IPL, which are disposed in the second conductive layer, may be made of a conductive polymer and or a conductive metal oxide.

The second interlayer insulation layer 115 may be provided on the second conductive layer. In an exemplary embodiment of the present invention, the second interlayer insulation layer 115 may be a second interlayer insulation film. The second interlayer insulation layer 115 may have a thickness thicker than thicknesses of the gate insulation layer 113 and the first interlayer insulation layer 114. In an example, the thickness of the second interlayer insulation layer 115 may be equal to or greater than the sum of the thickness of the gate insulation layer 113 and the thickness of the first interlayer insulation layer 114. For example, the second interlayer insulation layer 115 may have a thickness of about 5000 Å, but the thickness of the second interlayer insulation layer 115 is not limited thereto. When the second interlayer insulation layer 115 is formed to have a thickness thicker than the sum of the thickness of the gate insulation layer 113 and the thickness of the first interlayer insulation layer 114, electrical stability between components disposed on a first surface (e.g., a rear surface) and a second surface (e.g., a front surface) of the second interlayer insulation layer 115 can be ensured. Accordingly, a short circuit defect can be prevented.

The second interlayer insulation layer 115 may include one or more inorganic layers and/or one or more organic layers. In an example, the second interlayer insulation layer 115 may include an inorganic layer comprising SiOx and/or SiNx, but the present invention is not limited thereto. For example, the second interlayer insulation layer 115 may include an organic insulation material or an inorganic insulation material, such as SiOx, SiNx, SiON, SiOF and/or AlOx, and may be a single layer or multi-layer.

A third conductive layer may be disposed on the second interlayer insulation layer 115. In an exemplary embodiment of the present invention, the third conductive layer may be a source-drain layer comprising a source electrode and a drain electrode which are connected to the active pattern.

The data line Dj the power line PL, the connection line CNL, the bridge pattern BRP, and the auxiliary connection line AUX may be provided in the third conductive layer.

The data line Dj may be connected to the second source electrode SE2 through the sixth contact hole CT6 penetrating the gate insulation layer 113, the first interlayer insulation layer 114, and the second interlayer insulation layer 115.

The power line PL may be connected to the second capacitor electrode UE as an upper electrode of the storage capacitor Cst through a third contact hole CT3. Also, the power line PL may be connected to the fifth source electrode SE5 through the fifth contact hole CT5 penetrating the gate insulation layer 113, the first interlayer insulation layer 114, and the second interlayer insulation layer 115.

The connection line CNL may be connected to the first gate electrode GE1 through the first contact hole CT1 penetrating the first interlayer insulation layer 114 and the second interlayer insulation layer 115. Also, the connection line CNL may be connected to the third drain electrode DE3 and the fourth source electrode SE4 through the second contact hole CT2 penetrating the gate insulation layer 113, the first interlayer insulation layer 114, and the second interlayer insulation layer 115.

The bridge pattern BRP may be pattern provided as a medium that connects the sixth drain electrode DE6 and the first electrode AD between the sixth chain electrode DE6 and the first electrode AD. The bridge pattern BRP may be connected to, the sixth drain electrode DE6 and the seventh source electrode SE7 through the fourth contact bole CT4 penetrating the gate insulation layer 113, the first interlayer insulation layer 114, and the second interlayer insulation layer 115.

The auxiliary connection line AUX may be connected to the initialization power line IPL through the eighth contact hole CT8 penetrating the second interlayer insulation layer 115. Also, the auxiliary connection line AUX may be connected to the seventh drain electrode DE7 through the ninth contact hole CT9 penetrating the gate insulation layer 113, the first interlayer insulation layer 114, and the second interlayer insulation layer 115.

The data line Dj, the power line PL, the connection line CNL, the bridge pattern BRP, and/or the auxiliary connection line AUX which are disposed in the third conductive layer, may be made of the same material. For example, the data line Dj, the power line PL, the connection line CNL, the bridge pattern BRP, and/or the auxiliary connection line AUX may be formed of a predetermined source-drain metal.

The source-drain metal may include one of the metal materials provided as examples of the first gate metal and/or the second gate metal, but the present invention is not limited thereto. In addition, the material constituting the data line Dj, the power line PL, the connection line CNL, the bridge pattern BRP, and/or the auxiliary connection line AUX, which are disposed in the third conductive layer, is not necessarily limited to metal. For example, any material capable of providing conductivity high enough to smoothly drive the pixels PXL may be used as the material constituting the data line Dj, the power line PL, the connection line CNL, the bridge pattern BRP, and/or the auxiliary connection line AUX. For example, the data line Dj, the power line PL, the connection line CNL, the bridge pattern BRP, and/or the auxiliary connection line AUX may be made of a conductive polymer or conductive metal oxide.

At least two of the first gate metal, the second gate metal, and the source-drain metal may include the same material. In an example, the first gate metal and the second gate metal may be made of the same material even when the first gate metal and the second gate metal are disposed in different layers. However, the present invention is not limited thereto. For example, in an exemplary embodiment of the present invention, the first gate metal, the second gate metal, and the source-drain metal may all be made of different materials.

A protective layer 116 may be provided on the third conductive layer. In an embodiment, the protective layer 116 may include a passivation layer and/or a planarization layer. The protective layer 116 may include the seventh contact hole CT7 through which a portion of the bridge pattern BRP is exposed.

The light emitting element LD may be provided on the protective layer 116. The light emitting element LD may include the first electrode AD, the second electrode CD, and the emitting layer EML provided between the first and second electrode AD and CD.

In an exemplary embodiment of the present invention, the protective layer 116 may have a thickness of 1000 Å to 1800 Å, e.g., a thickness of about 1600 Å, but the thickness of the protective layer 116 is not limited thereto.

At least one of the first electrode AD and the second electrode CD may be a transmissive electrode. For example, when the light emitting element LD is a bottom-emission light emitting device, the first electrode AD may be a transmissive electrode, and the second electrode CD may be a reflective electrode. When the light emitting element LD is a top-emission light emitting device, the first electrode AD may be a reflective electrode, and the second electrode CD may be a transmissive electrode. In addition, when the light e lining element LD is a dual-emission light emitting device, both the first electrode AD and the second electrode CD may be transmissive electrodes. Hereinafter, a case where the light emitting element LD is a top-emission light emitting device and the first electrode AD is an anode electrode is described as an example. Although a case where the light emitting element LD is used as a light source in this exemplary embodiment, the present invention is not limited thereto. For example, the light emitting element LD may be replaced with another type of light emitting element.

The first electrode AD may be provided on the protective layer 116. The first electrode AD may be connected to the bridge pattern BRP through a seventh contact hole CT7 penetrating the protective layer 116. Since the bridge pattern BRP is connected to the sixth drain electrode DE6 and the seventh source electrode SE7 through the fourth contact hole CT4, the first electrode AD may be finally connected to the sixth drain electrode DE5 and the seventh source electrode SE7 through the bridge pattern BRP.

The first electrode AD may include a reflective layer capable of reflecting light and a transparent conductive layer disposed on a second surface (e.g., a front surface) or a first surface (e.g., a rear surface) of the reflective layer. At least one of the transparent conductive layer and the reflective layer may be connected to the sixth drain electrode DE6 and the seventh source electrode SE7.

The reflective layer may include a material capable of reflecting light. For example, the reflective layer may include aluminum (Al), silver (Ag), chromium (Cr), molybdenum (Mo), platinum (Pt), nickel (Ni), and/or alloys thereof.

The transparent conductive layer may include a transparent conductive oxide. For example, the transparent conductive layer may include ITO, IZO, AZO, Gallium doped Zinc Oxide (GZO), Zinc Tin Oxide (ZTO), Gallium Tin Oxide (GTO), and Fluorine Doped Tin Oxide (FTO).

The emitting layer EML may be disposed on the exposed surface of the first electrode AD. The emitting layer EML may have a multi-layered thin film structure comprising at least a light generation layer (LGL), a hole transport layer (HTL), an electron transport layer (ETL), an electron injection layer (EIL) and a hole blocking layer (HBL). The HTL may be used for it holes. The HTL may be used for transporting holes. The HTL may increase the opportunity for holes and electrons to be re-combined by suppressing the movement of electrons that fail to be combined in the LG. The LGL may be used for emitting light through the re-combination of the injected electrons and holes. The HBL may be provided to suppress the movement of holes that fail to be combined in the LGL. The ETL may be provided for transporting electrons to the LGL, and the EIL may be provided for injecting electrons.

The color of light generated in the LGL may be one of red, green, blue, and white, but the present invention is not limited thereto. For example, the color of light generated in the LGL may also be one of magenta, cyan, and yellow.

The HIL, the HTL, the HBL, the LTL, and the EIL may be common layers connected in light emitting regions adjacent to each other.

The second electrode CD may be a semi-transmissive reflective layer. For example, the second electrode CD may be a thin film metal layer having a thickness thick enough to enable light to be transmitted therethrough. In an example, the second electrode CD may allow a portion of the light emitted from the emitting layer EML to be transmitted therethrough, and reflect the rest of the light emitted from the emitting layer EML.

In an exemplary embodiment of the present invention, the second electrode CD may include a material having a work function lower than a work function of the transparent conductive layer. For example, the second electrode CD may include molybdenum (Mo), tungsten (W), silver (Ag), magnesium (Mg), aluminum (Al), platinum (Pt), palladium (Pd), gold (Au), nickel (Ni), neodymium (Nd), iridium (1r), chromium (Cr), lithium (LD), calcium (Ca), and/or alloys thereof.

A portion of the light emitted from the emitting layer EML is not transmitted through the second electrode CD, but the light reflected from the second electrode CD may be re-reflected from the reflective layer. For example, the light emitted from the emitting layer EML may resonate between the reflective layer and the second electrode CD. The light extraction efficiency of the light emitting element LD can be increased by the resonance of the light.

A pixel defining layer (also referred to herein as a bank layer) 117 defines a light emitting region of each pixel PXL and may be provided on the substrate SUB on which the first electrode AD and the like are disposed. The pixel defining layer 117 may expose a second surface (e.g., a front surface) of the first electrode AD, and may protrude from the substrate SUB along the circumference of each light emitting region.

The emitting layer EML may be provided in the light emitting region of each pixel PXL, which is surrounded by the pixel defining layer 117, and the second electrode CD may be provided on the emitting layer EML. One of the first electrode AD and the second electrode CD may be an anode electrode, and the other of the first electrode AD and the second electrode CD may be a cathode electrode. For example, the first electrode AD may be an anode electrode, and the second electrode CD may be a cathode electrode.

The pixel defining layer 117 may include an organic insulation material. For example, the pixel defining layer 117 may include polystytrene, polymethylmethacrylate (PMMA), polyarcylonitrile (PAN), polyimide (PA), polyimide (PI), polyarylether (PAE), heterocyclic polymer, parylene, epoxy, benzocyclobutene (BCB), siloxane based resin, and/or silane based resin.

A first protective layer PTL1 covering the second electrode CD may be provided over the second electrode CD. The first protective layer PTL1 may be a thin film encapsulation layer. In an exemplary embodiment of the present invention, the thin film encapsulation layer may be replaced with another type of encapsulation layer or encapsulation substrate, at least one protective layer, etc.

The thin film encapsulation layer may prevent oxygen and moisture from penetrating into the light emitting element LD. The thin film encapsulation layer may include an inorganic layer. The inorganic layer may include silicon oxide, silicon nitride, silicon oxynitride, aluminum oxide, titanium oxide, zirconium oxide, and/or tin oxide.

The circuit elements and the lines, which are disposed on the first surface (e.g., the front surface) of the substrate SUB, from the buffer layer 112 to the protective layer 116 may comprise a circuit element layer BPL of the display device 10" and/or the fingerprint sensor. In addition, the light emitting element LD disposed in each pixel PXL from the first electrode AD to the second electrode CD and the thin film encapsulation layer disposed between the light g elements LD may comprise the light emitting element layer LDL of the display device 10" and/or the fingerprint sensor.

Further referring to FIGS. 18, 19 and 20, the pixel PXL in accordance with the exemplary embodiment of the present invention may include a light-passing hole LTH formed in at least one conductive layer of the circuit element layer BPL. The sensing region SA may include a plurality of pixels PXL comprising the light-passing hole LTH.

The light-passing hole LTH may include openings formed to overlap with each other in a plurality of conductive layers comprising the circuit element layer BPL. For example, the light-passing hole LTH may include multi-layered openings that overlap each other in at least two layers among a semiconductor layer in which the active patterns are disposed, the first conductive layer in which the gate electrodes GE1, GE2, GE3, GE4, GE5, GE6 and GE7 are disposed, the second conductive layer in which the second capacitor electrode UE and the like are disposed, the third conductive layer in which the power line PL and the like are disposed, and the third conductive layer in which the bridge pattern BRP and the like are disposed.

In accordance with the above-described exemplary embodiment of the present invention, a light passing hole array for receiving reflected light may be integrally formed with the light emitting element layer LDL and the circuit element layer BPL, without forming any additional layer in the circuit element layer BPL. Accordingly, the module thickness of the display device 10" can be decreased.

The arrangement and shape of the light-passing hole LTH are not limited to those shown in the exemplary embodiments of the present invention depicted with reference to FIGS. 18 to 20. For example, the light-passing hole LTH may be formed in another region, e.g., a region comprising the opening OPN formed in the first gate electrode GE1. Therefore, a layout structure may be variously modified such that any conductive layer is not disposed in the light-passing hole LTH.

The size (e.g., width or diameter) of the light-passing hole LTH may be determined by the size of the openings. For example, the width of the light-passing hole LTH may be the narrowest width among the widths of the openings.

The light-passing hole LTH may be formed in pixels PXL at positions corresponding to the pin hole regions PIHA shown in FIGS. 13, 14 and 15 among the pixels PXL arranged in the sensing region SA. In an exemplary embodiment of the present invention, the light-passing hole LTH may be formed in some or all of the pixels PXL at the positions corresponding to the pin hole regions PIHA shown in FIGS. 13, 14 and 15. The distance between the emission control line Ei and the initialization power line IPL and/or the distance between the fifth source electrode SE5 and the sixth drain electrode DE6 in the pixel PXL in which the light-passing hole LTH is not formed may be narrower than that in the pixel PXL in which the light-passing hole LTH is formed.

FIGS. 21A, 21B, 21C and 21D are plan views illustrating various arrangement structures of pixels, sensor pixels, and pin holes, in accordance with an exemplary embodiment of the present invention. For example, FIGS. 21A, 21B, 21C and 21D illustrate various exemplary embodiments depicting various relative size, resolution, and/or arrangement relationships of the pixels PXL, the sensor pixels SPXL, and the pin holes PIH, which are arranged in the sensing region SA.

In FIGS. 21A, 21B, 21C and 21D, the sensor pixels SPXL may be sensor pixels provided in one photo sensor unit PHU. FIGS. FIGS. 21A, 21B, 21C and 21D illustrate an arrangement relationship of sensor pixels SPXL, pixels PXL, and pin holes PIH in one region of the photo sensor unit PHU, when the photo sensor unit PHU is disposed to overlap with at least one pixel PXL and at least one pin hole PIH.

Figure 21A:
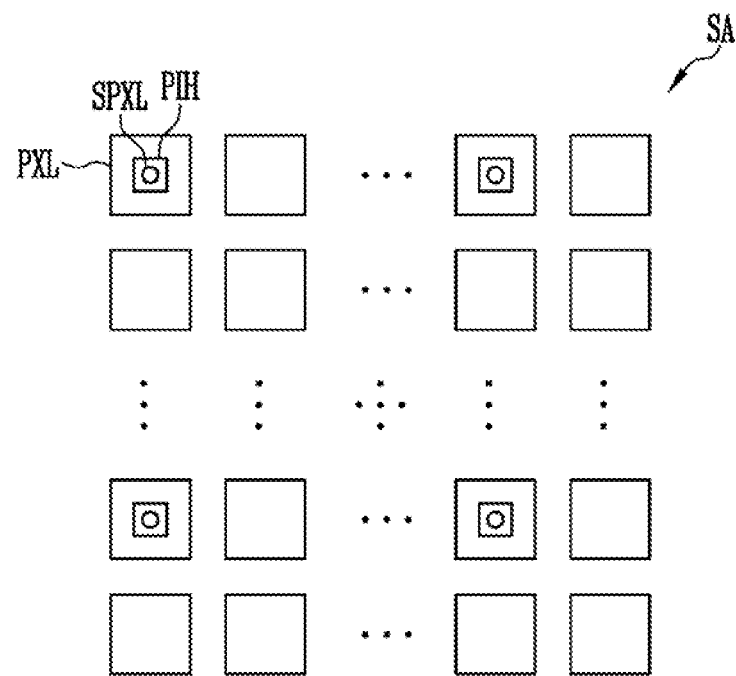
FIGS. 21A, 21B, 21C and 21D are plan views illustrating an arrangement of pixels, sensor pixels and pin holes according to exemplary embodiments of the present invention.

Referring to FIG. 21A, the number of pin holes PIH and sensor pixels SPXL in the sensing region SA may be smaller than the number of pixels PXL in the sensing region SA. For example, the pin holes PIH and the sensor pixels SPXL have sizes smaller than that of the pixels PXL, and may be dispersed in the sensing region SA at a resolution lower than a resolution of the pixels PXL.

Although the numbers of the pin holes PIH and the sensor pixels SPXL are smaller than the number of the pixels PXL in FIG. 21A, the present invention is not limited thereto. For example, in an exemplary embodiment of the present invention, the pin holes PIH and the sensor pixels SPXL may be dispersed in the sensing region SA in the same number and at the same distance such that the pin holes PIH correspond one-to-one to the sensor pixels SPXL. For example, the pin holes PIH and the sensor pixels SPXL may be disposed to overlap with each other in pairs.

In an exemplary embodiment of the present invention, a pair of a pin hole PIH and a sensor pixel SPXL may be disposed to overlap with any one pixel PXL disposed in the sensing region SA, but the present invention is not limited thereto. For example, the pin holes PIH and the sensor pixels SPXL may be alternately disposed not to overlap with each other, or may be disposed not to overlap with the pixels PXL.

The pin holes PIH and the sensor pixels SPXL may have sizes equal to or different from each other. For example, the relative sizes and/or resolutions of the pin holes PIH and the sensor pixels SPXL are not particularly limited.

Figure 21B:
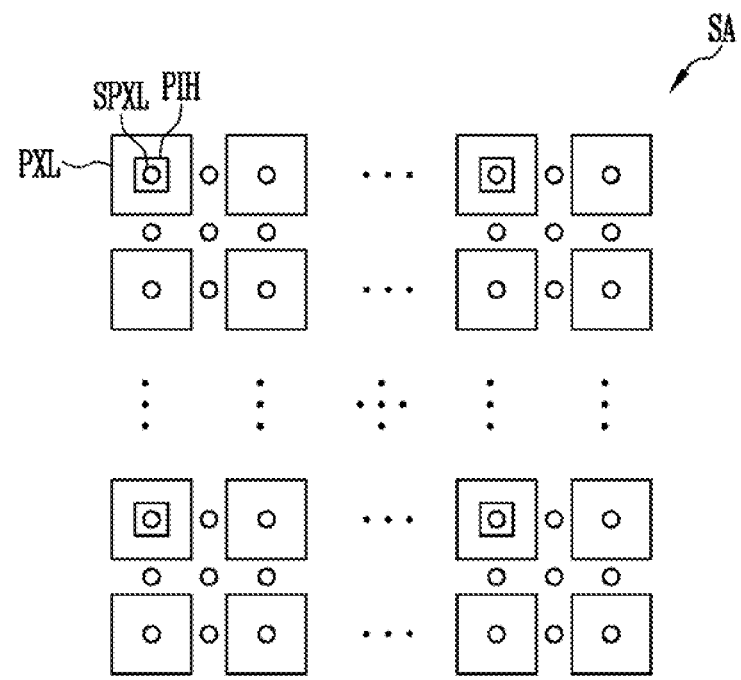

Referring to FIG. 21B, the sensing region SA may include pin holes PIH of a smaller number than a number of pixels PXL, and a number of sensor pixels SPXL may be greater than the number of the pixels PXL. For example, the pin holes PIH and the sensor pixels SPXL may have sizes smaller than that of the pixels PXL. The pin holes PIH may be dispersed in the sensing region SA in a resolution lower than a resolution of the pixels PXL, and the sensor pixels SPXL may be densely dispersed in the sensing region SA in a resolution higher than the resolution of the pixels PXL.

At least some of the sensor pixels SPXL may overlap with any one pin hole and/or any one pixel PXL, but the present invention is not limited thereto. For example, some of the sensor pixels SPXL may be disposed to overlap with the pin holes PIH and/or the pixels PXL, and other some of the sensor pixels SPXL may be disposed in a gap between the pixels PXL. For example, the sensor pixels SPXL disposed at gaps between the pixels PXL may be arranged in a regular pattern of rows and/or columns. However, the present invention is not limited thereto.

Figure 21C:
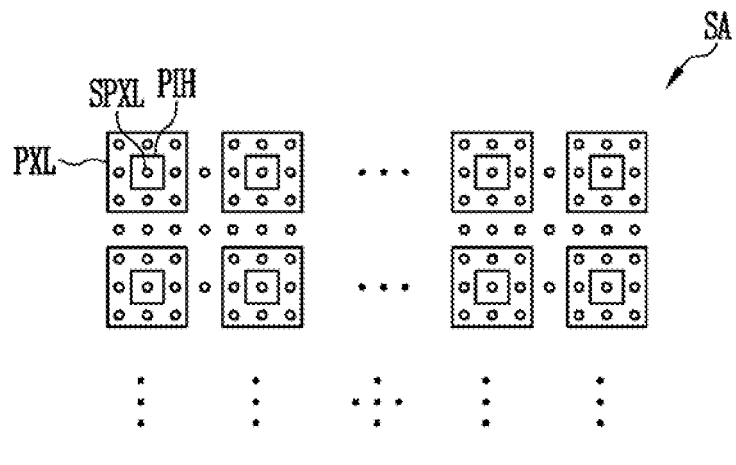
Figure 21D:
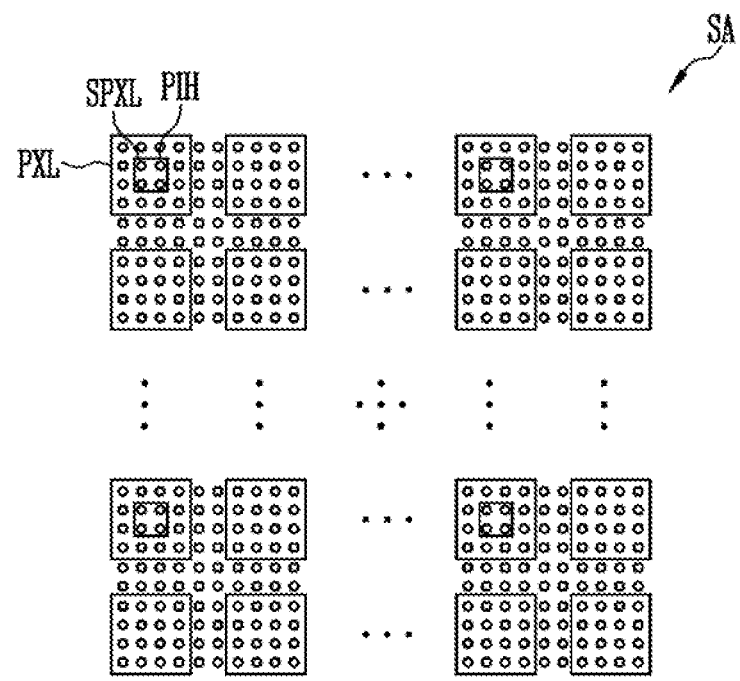

Referring to FIGS. 21C and 21D, the sensor pixels SPXL dispersed in the sensing region SA may have smaller size than the size of the sensor pixels SPXL shown in FIG. 21B, and may have a resolution that is greater than the resolution of the exemplary embodiment of the present invention shown in FIG. 21B. For example, a plurality of sensor pixels SPXL may overlap with each pin hole PIH and/or each pixel PXL. The pin holes PIH may be dispersed in the sensing region SA in a resolution equal to or similar to a resolution of the pixels PXL. For example, the pin holes PIH may be dispersed in the sensing region SA at a resolution equal to that of the pixels PXL as shown in FIG. 21C, or may be dispersed in the sensing region SA in a resolution lower than a resolution of the pixels PXL as shown in FIG. 21D.

According to an exemplary embodiment of the present invention, as illustrated in FIG. 21C, the plurality of sensor pixels SPXL may be disposed in rows and columns at a different resolution within a region bounded by a pixel PXL from a resolution of the sensor pixels SPXL disposed at gaps between pixels. For example, sensor pixels disposed in a column between a 2×2 grid of pixels PXL may have a greater spacing from an intersecting row disposed at a gap between the 2×2 grid of pixels PXL.

According to the exemplary embodiment of the present invention shown in FIG. 21D, the sensor pixels SPXL may be disposed in a regular pattern both at gap regions between the 2×2 grid of pixels PXL and within areas bounded by the pixels PXL. The pinholes PIH may be disposed at an upper right corner of each 2×2 grid, and may contain four sensor pixels SPXL disposed at outer edges (e.g., corners) of the pinholes PIH.

Although an exemplary embodiment in which the pin holes PIH and the sensor pixels SPXL are arranged in a regular array form in the sensing region SA is illustrated in FIGS. 21A, 21B, 21C and 21D, the present invention is not limited thereto. For example, the pin holes PIH and/or the sensor pixels. SPXL may be arranged in an irregular pattern in the sensing region SA, or may be dispersed at different densities as between units of the same identity and/or as between units of the other.

The arrangement structure of the pixels PXL, the pin holes PIH, and the sensor pixels SPXL are not limited to the exemplary embodiments of the present invention shown in FIGS. 21A, 21B, 21C and 21D. For example, the shapes, arrangement forms, relative sizes, numbers, resolutions, and/or correlations of the pixels PXL, the pin holes PIH, and/or the sensor pixels SPXL, which are arranged in the sensing region SA may be variously modified.

According to exemplary embodiments of the present invention set forth herein, a display device is provided including a sensor layer comprising a plurality of photo sensor units configured as small area CIS packages, so that a high-resolution and low-cost display device having a built-in fingerprint sensors can be implemented.

Although exemplary embodiments of the present invention have been described heretofore, it will be understood by those skilled in the art that various changes in form and details may be made therein without departing from the spirit and scope of the present invention as set forth in the following claims.

What is claimed is:

1. A display device, comprising:
a substrate comprising a display region comprising a plurality of pixels;
a sensing region provided in at least one region of the display region;
a circuit element layer disposed on the substrate, the circuit element layer comprising a plurality of conductive layers;
a light emitting element layer provided on the circuit element layer, the light emitting element layer comprising a plurality of light emitting elements; and
a sensor layer disposed on the substrate,
wherein the sensor layer comprises a plurality of photo sensor units,
wherein each of the photo sensor units comprises a plurality of sensor pixels,
wherein the plurality of sensor pixels included in each of the photo sensor units are spaced apart from each other by a same pitch,
wherein the plurality of photo sensor units are disposed in a two-dimensional array comprising a plurality of rows and a plurality of columns, and
wherein, at least one of the photo sensor units of the plurality of photo sensor units is not aligned in a column direction with any other photo sensor unit of the plurality of photo sensor units disposed in a most adjacent row.

2. The display device of claim 1,
wherein the photo sensor units are arranged in an irregular pattern in the sensing region.

3. The display device of claim 1,
wherein the photo sensor units are arranged in an irregular pattern in the sensing region, and
wherein, at least one of the photo sensor units of the plurality of photo sensor units is not aligned in a row direction with any other photo sensor unit of the plurality of photo sensor units disposed in a most adjacent column.

4. The display device of claim 2, wherein the distance between adjacent photo sensor units of the plurality of photo sensor units in a row direction and the column direction is 5 mm or less.

5. The display device of claim 3, wherein the distance between adjacent photo sensor units of the plurality of photo sensor units in the row direction and the column direction is 5 mm or less.

6. The display device of claim 1, wherein the width or diameter of the photo sensor units is 5 mm or less.

7. The display device of claim 1, wherein a total area of the photo sensor units is equal to or smaller than ½ of an area of the sensing region.

8. The display device of claim 1, further comprising a fingerprint detector configured to apply driving signals to the sensor pixels and receive electrical signals output from the sensor pixels.

9. The display device of claim 8, wherein, the fingerprint detector comprises:
a horizontal driver configured to apply the driving signals to the sensor pixels through driving lines;
a vertical driver configured to covert an analog signal output from the sensor pixels into a digital signal and output the digital signal; and
a controller configured to generate timing signals and control the horizontal driver and the vertical driver based on the generated timing signals.

10. The display device of claim 1, further comprising a light blocking layer disposed between the substrate and the circuit element layer, the light blocking layer having pin holes formed therein,
wherein the pin holes allow light to selectively pass therethrough, and
wherein the photo sensor units are arranged in an irregular pattern in the sensing region.

11. The display device of claim 10, wherein the light blocking layer comprises a plurality of pinhole regions in which the respective pin holes are formed, wherein the pinhole regions are irregularly arranged in the light blocking layer.

12. The display device of claim 11, wherein the pinhole regions are disposed on a two-dimensional array comprising a plurality of rows and a plurality of columns, wherein, at least one of the pinhole regions is not aligned in a column direction with any other pinhole region disposed in a most adjacent row.

13. The display device of claim 11, wherein the pinhole regions are disposed on a two-dimensional array comprising a plurality of rows and a plurality of columns, wherein, at least, one of the pinhole regions is not aligned, in a row direction with any other pinhole region disposed in a most adjacent column.

14. The display device of claim 11, wherein the pinhole regions are arranged to correspond one-to-one to the photo sensor units.

15. The display device of claim 1,
wherein the photo sensor units are arranged in an irregular pattern in the sensing region, and
wherein the plurality of conductive layers comprise:
a semiconductor layer comprising an active pattern comprising at least one transistor;
a first gate layer comprising a gate electrode disposed such that at least a portion of the gate electrode overlaps with the active pattern;

a second gate layer comprising at least one capacitor electrode; and a source-drain layer comprising a source electrode and a drain electrode, which are connected to the active pattern.

16. The display device of claim 15, wherein the circuit element layer further comprises a plurality of light-passing regions each comprising light passing holes, and wherein each of the light-passing holes comprises multi-layered openings formed in the semiconductor layer, the first gate layer, the second gate layer, and the source-drain layer to overlap with each, other.

17. The display device of claim 16, wherein the light-passing regions are disposed on a two-dimensional array comprising a plurality of rows and a plurality of column: wherein, at least one of the light-passing regions is not aligned in a column direction with any other light passing region disposed in a most adjacent row.

18. The display device of claim 16, wherein the light-passing regions are disposed on a two-dimensional array comprising a plurality of rows and a plurality of columns, wherein, at least one of the light-passing regions is not aligned in a row direction with any other light-passing region disposed in a most adjacent column.

19. The display device of claim 16, wherein the light-passing regions are arranged to correspond one-to-one to the photo sensor units.

20. A display device, comprising:

a substrate comprising a display region comprising a plurality of pixels and a sensing region provided in at least one region of the display region;

a circuit element layer disposed on a first surface of the substrate, the circuit element layer comprising a plurality of conductive layers;

a light emitting element layer provided on the circuit element layer, the light emitting element layer comprising a plurality of light emitting elements;

a plurality of pin holes disposed in the circuit element layer and/or a light blocking layer disposed between the circuit element layer and the substrate; and a sensor layer disposed on a second surface of the substrate opposite to the first surface, wherein the sensor layer comprises a plurality of photo sensor units, wherein each of the photo sensor units comprises a plurality of sensor pixels, wherein at least one among the photo sensor units, the sensor pixels, and the pin holes are arranged in the sensing region, wherein the photo sensor units at least partially overlap the pixels in a thickness direction and are configured to use at least some of the plurality of pixels disposed in the sensing region as a light source, wherein the plurality of sensor pixels included in each of the photo sensor units are spaced apart from each other by a same pitch, wherein the plurality of photo sensor units are disposed in a two-dimensional array comprising a plurality of rows and a plurality of columns, and wherein, at least one of the photo sensor units of the plurality of photo sensor units is not aligned in a column direction with any other photo sensor unit of the plurality of photo sensor units disposed m a most adjacent row.

* * * * *